US012640424B2

(12) United States Patent
Sun et al.

(10) Patent No.: US 12,640,424 B2
(45) Date of Patent: May 26, 2026

(54) BATTERY PACK AND ELECTRIC VEHICLE

(71) Applicant: BYD COMPANY LIMITED,
Shenzhen (CN)

(72) Inventors: Huajun Sun, Shenzhen (CN);
Xiaopeng Wang, Shenzhen (CN);
Qingbo Peng, Shenzhen (CN); **Zhipei
Lu, Shenzhen (CN); Yan Zhu**,
Shenzhen (CN)

(73) Assignee: BYD Company Limited, Shenzhen
(CN)

( * ) Notice: Subject to any disclaimer, the term of this
patent is extended or adjusted under 35
U.S.C. 154(b) by 614 days.

(21) Appl. No.: 17/989,585

(22) Filed: Nov. 17, 2022

(65) Prior Publication Data

US 2023/0080969 A1 Mar. 16, 2023

Related U.S. Application Data

(63) Continuation of application No.
PCT/CN2020/124745, filed on Oct. 29, 2020.

(30) Foreign Application Priority Data

May 22, 2020 (CN) .......................... 202010444245.9

(51) Int. Cl.
*H01M 50/207* (2021.01)
*B60L 50/64* (2019.01)
(Continued)

(52) U.S. Cl.
CPC ........... *H01M 50/207* (2021.01); *B60L 50/64*
(2019.02); *H01M 10/613* (2015.04);
(Continued)

(58) Field of Classification Search
CPC ............. H01M 50/207; H01M 50/249; H01M
50/474; H01M 50/591; H01M 50/531;
(Continued)

(56) References Cited

U.S. PATENT DOCUMENTS

2009/0239136 A1* 9/2009 Nagamine ......... H01M 10/0481
429/148
2013/0022859 A1* 1/2013 Lim .................. H01M 10/0525
429/159
(Continued)

FOREIGN PATENT DOCUMENTS

CN 105576171 A 5/2016
CN 206022451 U 3/2017
(Continued)

OTHER PUBLICATIONS

Machine Translation of CN109428021A (Jun. 30, 2025) (Year: 2025).*

(Continued)

*Primary Examiner* — Matthew J Merkling
(74) *Attorney, Agent, or Firm* — Sheppard Mullin Richter
& Hampton LLP

(57) ABSTRACT

A battery pack includes a housing and multiple electrode
core strings electrically connected to each other and dis-
posed in the housing. The housing includes a housing body
which includes sub-housings connected to each other. A
sub-housing includes at least one reinforcing plate and a top
plate and a bottom plate oppositely arranged in a first
direction. The reinforcing plate is arranged between and is
connected to the top plate and the bottom plate, and divides
an interior of the corresponding sub-housing into multiple
accommodating cavities. At least one accommodating cavity
includes at least one electrode core string which includes
electrode core assemblies connected and arranged in a
second direction. The electrode core assemblies are disposed
in an encapsulation film. A length of the electrode core string
extends in the second direction. The housing includes a
mounting component that is configured to be connected and
fixed to an external load.

20 Claims, 9 Drawing Sheets

(51) Int. Cl.

| | |
|---|---|
| *H01M 10/613* | (2014.01) |
| *H01M 10/625* | (2014.01) |
| *H01M 10/6567* | (2014.01) |
| *H01M 50/112* | (2021.01) |
| *H01M 50/174* | (2021.01) |
| *H01M 50/244* | (2021.01) |
| *H01M 50/249* | (2021.01) |
| *H01M 50/291* | (2021.01) |
| *H01M 50/342* | (2021.01) |
| *H01M 50/474* | (2021.01) |
| *H01M 50/477* | (2021.01) |
| *H01M 50/51* | (2021.01) |
| *H01M 50/512* | (2021.01) |
| *H01M 50/531* | (2021.01) |
| *H01M 50/548* | (2021.01) |
| *H01M 50/588* | (2021.01) |
| *H01M 50/591* | (2021.01) |

(52) U.S. Cl.
CPC ..... *H01M 10/625* (2015.04); *H01M 10/6567* (2015.04); *H01M 50/112* (2021.01); *H01M 50/174* (2021.01); *H01M 50/244* (2021.01); *H01M 50/249* (2021.01); *H01M 50/291* (2021.01); *H01M 50/3425* (2021.01); *H01M 50/474* (2021.01); *H01M 50/477* (2021.01); *H01M 50/51* (2021.01); *H01M 50/512* (2021.01); *H01M 50/531* (2021.01); *H01M 50/548* (2021.01); *H01M 50/588* (2021.01); *H01M 50/591* (2021.01); *H01M 2200/20* (2013.01); *H01M 2220/20* (2013.01)

(58) Field of Classification Search
CPC ............. H01M 50/548; H01M 50/244; H01M 50/3425; H01M 50/51; H01M 50/291; H01M 50/174; H01M 50/588; H01M 50/112; H01M 50/477; H01M 50/512; H01M 10/613; H01M 10/625; H01M 10/6567; B60L 50/54
See application file for complete search history.

(56) References Cited

U.S. PATENT DOCUMENTS

| | | | | |
|---|---|---|---|---|
| 2016/0036022 A1* | 2/2016 | Tononishi | ........... | H01M 10/658 429/53 |
| 2016/0036025 A1* | 2/2016 | Hofer | ................. | H01M 50/325 429/56 |
| 2017/0125756 A1* | 5/2017 | Nietling | ............. | H01M 50/209 |
| 2017/0194676 A1* | 7/2017 | Omura | ............... | H01M 10/625 |
| 2020/0067040 A1 | 2/2020 | Kim et al. | | |
| 2020/0144568 A1 | 5/2020 | Lee et al. | | |
| 2021/0036278 A1* | 2/2021 | Tang | ................. | H01M 50/204 |
| 2021/0126231 A1* | 4/2021 | Wang | ................. | H01M 50/209 |

FOREIGN PATENT DOCUMENTS

| | | | |
|---|---|---|---|
| CN | 207651571 U | 7/2018 | |
| CN | 208298914 U | 12/2018 | |
| CN | 109428021 A | 3/2019 | |
| CN | 110073513 A | 7/2019 | |
| CN | 110088939 A | 8/2019 | |
| CN | 110165118 A | 8/2019 | |
| CN | 110190211 A | 8/2019 | |
| CN | 110323462 A | 10/2019 | |
| CN | 110518174 A | 11/2019 | |
| CN | 210006806 U | 1/2020 | |
| CN | 110828717 A | 2/2020 | |
| CN | 110911604 A | 3/2020 | |
| CN | 111106279 A | 5/2020 | |
| CN | 111293253 A | 6/2020 | |
| CN | 111312964 A | 6/2020 | |
| CN | 110828745 B | 7/2020 | |
| CN | 113193280 A * | 7/2021 | ........ H01M 10/6557 |
| CN | 109219899 B | 12/2021 | |
| EP | 3528312 A1 | 8/2019 | |

OTHER PUBLICATIONS

Machine Translation of CN-113193280-A (Jun. 30, 2025) (Year: 2025).*

International Search Report and Written Opinion for Application No. PCT/CN2020/124745, mailed on Feb. 22, 2021, 13 pages.

* cited by examiner

BATTERY PACK AND ELECTRIC VEHICLE

CROSS-REFERENCE TO RELATED APPLICATIONS

This application is a continuation application of international patent application No. PCT/CN2020/124745 filed with the China National Intellectual Property Administration (CNIPA) on Oct. 29, 2020, which is based on and claims priority to and benefits of Chinese Patent Application No. 202010444245.9, filed on May 22, 2020. The entire content of all of the above-referenced applications is incorporated herein by reference.

FIELD

The present disclosure relates to the field of batteries, and specifically, to a battery pack and electric vehicle.

BACKGROUND

A traditional battery pack includes a housing and a battery module arranged in the housing. The housing of the battery pack includes a tray and an upper cover connected to the tray. The battery module is fixed on the tray. During the assembly of the battery pack, several batteries are generally arranged in sequence to form a battery assembly; then, end plates are arranged on both ends of the battery assembly in a length direction and side plates are arranged on both sides of the battery assembly in a width direction, and the end plates and the side plates are fixedly connected through bolts or pull rods or welding to form a battery module. Finally, the battery module is mounted in the tray through fasteners such as bolts.

SUMMARY

The present disclosure at least resolves one of the technical problems in the related art. To this end, according to a first aspect of the present disclosure, a battery pack is provided, which includes a housing and multiple electrode core strings electrically connected to each other and disposed in the housing. The housing includes a housing body. The housing body includes multiple sub-housings connected to each other. At least one of the sub-housings includes at least one reinforcing plate.

Each of the sub-housings includes a top plate and a bottom plate oppositely arranged in a first direction. The first direction is a height direction of the housing. The reinforcing plate is arranged between the top plate and the bottom plate. The at least one reinforcing plate is connected to the top plate and the bottom plate, and divides an interior of a corresponding sub-housing into multiple accommodating cavities. At least one of the accommodating cavities includes at least one of the electrode core strings.

Each of the electrode core strings includes multiple electrode core assemblies connected and arranged in a second direction. The electrode core assemblies are disposed in an encapsulation film. A length of the electrode core string extends in the second direction. The second direction is a length direction of the housing or a width direction of the housing.

The housing includes a mounting component, and the mounting component is configured to be connected and fixed to an external load.

According to a second aspect of the present disclosure, an electric vehicle is provided, which includes a vehicle body and the above-mentioned battery pack. The battery pack is fixed to the vehicle body through the mounting component.

BRIEF DESCRIPTION OF THE DRAWINGS

To describe the technical solutions in the embodiments of the present disclosure more clearly, the following briefly introduces the accompanying drawings required for use in the embodiments. Apparently, the accompanying drawings in the following description show only some embodiments of the present disclosure, and a person of ordinary skill in the art may also obtain other accompanying drawings from these accompanying drawings without creative efforts.

REFERENCE NUMERALS

Figure 1:
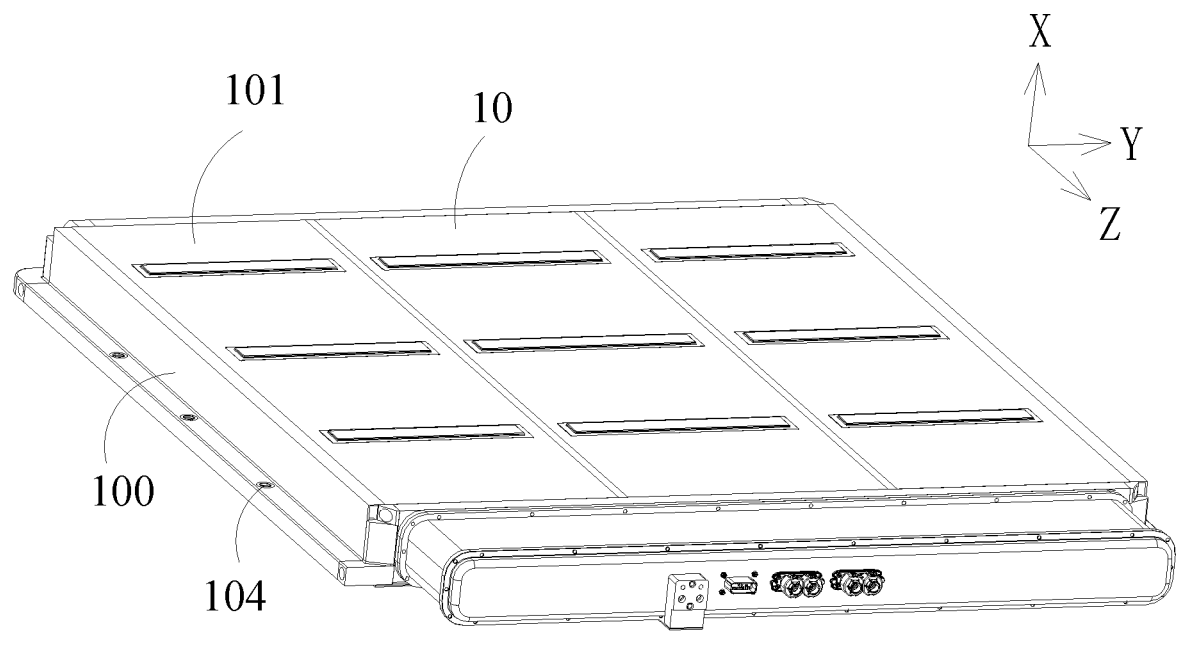
FIG. 1 is a schematic diagram of a structure of a battery pack according to an embodiment of the present disclosure.

1: electric vehicle;

10: battery pack;

100: housing; 101: sub-housing; 102: top plate; 103: bottom plate; 104: mounting component; 105: mounting hole; 106: first edge beam; 107: second edge beam; 108: partition plate; 109: connecting plate; 110: opening; 111: end plate; 112: adhesive injection hole; 113: housing body;

200: reinforcing plate;

300: accommodating cavity;

400: electrode core assembly; 401: electrode core string; 410: first electrode lead-out member; 420: second electrode lead-out member; 430: electrode core assembly body; 440: first conductive member; 450: fixing spacer; 451: insertion pin; 452: insertion hole; 453: first spacer; 454: second spacer; 460: second conductive member;

500: encapsulation film; 510: packaging component;

600: insulating support;

700: insulating protective cover;

800: explosion-proof valve; 801: protruding component; 802: cover body; 803: weak area;

900: liquid cooling member; and

20: vehicle body.

DETAILED DESCRIPTION

The following descriptions are merely preferred implementations of the present disclosure. It should be pointed out that a person of ordinary skill in the art may further make a number of improvements and modifications without departing from the principle of the present disclosure, and these improvements and modifications are also considered to fall within the protection scope of the present disclosure.

In the description of the present disclosure, it should be understood that, orientations or position relationships indicated by terms such as "length", "width", "up", "down", "front", "rear", "left", "right", "vertical", "horizontal", "top", "bottom", "inner", and "outer", are orientations or position relationships shown based on the accompanying drawings, and are used only for ease of describing the present disclosure and simplifying the description, rather than indicating or implying that the apparatus or element should have a particular orientation or be constructed and operated in a particular orientation, and therefore, should not be construed as a limitation on the present disclosure.

In addition, terms "first" and "second" are used merely for the purpose of description, and shall not be construed as indicating or implying relative importance or implying a quantity of indicated technical features. Therefore, features defining "first" and "second" can explicitly or implicitly include one or more of the features. In the descriptions of the present disclosure, unless otherwise explicitly specified, "multiple" means two or more.

In the present disclosure, it should be noted that unless otherwise clearly specified and limited, the terms "mounted", "connected", "connection", and "fixed" should be understood in a broad sense. For example, a connection may be a fixed connection, a detachable connection, or an integral connection; may be a mechanical connection or an electrical connection; may be a direct connection or an indirect connection through an intermediate medium; or may be internal communication between two elements or interaction relationship between two elements. A person of ordinary skill in the art can understand specific meanings of the terms in the present disclosure based on specific situations.

In the assembly process of the traditional battery pack, related structural members result in a large overall weight of the battery pack, which is not conducive to achieving lightweight design of an electric vehicle, and also reduce the space utilization inside the housing of the battery pack. As a result, the battery pack cannot meet the requirements for a high endurance capacity of the electric vehicle. Moreover, the above-mentioned assembly process is very cumbersome, which also results in an increase of production cost. In addition, the tray is usually formed by welding several edge beams and bottom plates. Furthermore, as main load-bearing component, in order to ensure that the tray has a sufficient structural strength, some reinforcing beams and longitudinal beams are generally welded inside the tray. In this way, the tray has too many components, a complex structure and low space utilization. Besides, at present, the housing of the battery pack is relatively simple in structure and poor in versatility, which is not conducive to standardization, modularization and mass production of the battery pack.

The battery pack in the present disclosure has the following effects. The housing of the battery pack in the present disclosure includes multiple sub-housings connected to each other. Moreover, the number of the sub-housings can be selected according to the actual needs. In this way, the design flexibility and versatility of the battery pack can be improved, thereby facilitating standardization, modularization, and mass production of the battery pack. Moreover, in the present disclosure, the reinforcing plate is arranged between the top plate and the bottom plate, and is connected to the top plate and the bottom plate. Such a design enables the reinforcing plate, the top plate and the bottom plate to form an I-shaped structure. This structure has high strength and stiffness, so that the housing of the battery pack has better performances such as load bearing, impact resistance and extrusion resistance. Furthermore, when the battery pack is mounted on a vehicle, the structural strength of the battery pack can be taken as a part of the structural strength of the vehicle. Therefore, the structural strength of the vehicle can be enhanced, which helps to achieve the requirements of lightweight design of the electric vehicle, and also reduces the design and manufacturing costs of the vehicle. Besides, in the present disclosure, the electrode core assemblies are packaged in an encapsulation film, multiple electrode core assemblies are connected in series to form an electrode core string, and the electrode core string is arranged in the housing of the battery pack, so as to achieve double seal through the encapsulation film and the housing of the battery pack, thereby improving the sealing effect. The electrode core string used in the present disclosure eliminate a battery housing and structural members constituting a battery module, thereby improving the space utilization of the battery pack, reducing the weight of the battery pack, and improving the energy density of the battery pack. Moreover, the battery pack in the present disclosure has a simple structure, a high assembly efficiency, and a low production cost.

Figure 18:
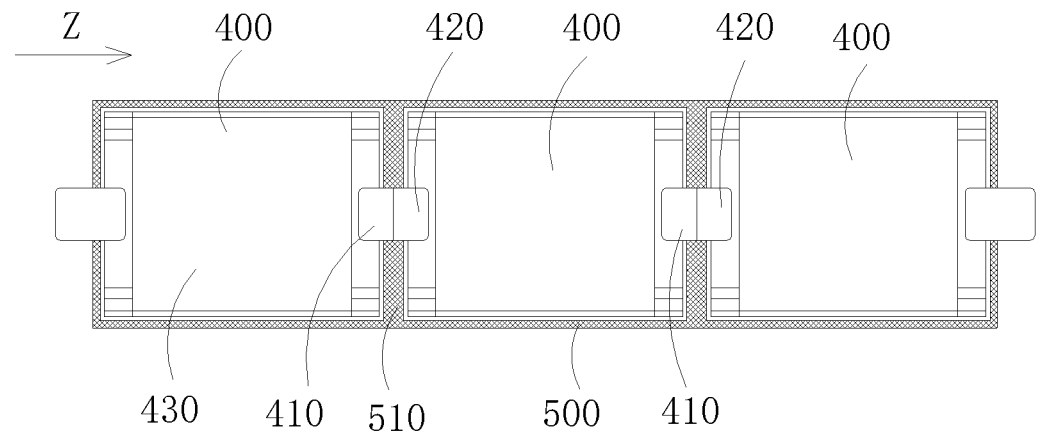
FIG. 18 is a schematic diagram of a structure in which electrode core assemblies are packaged with an encapsulation film according to an embodiment of the present disclosure.
Figure 19:
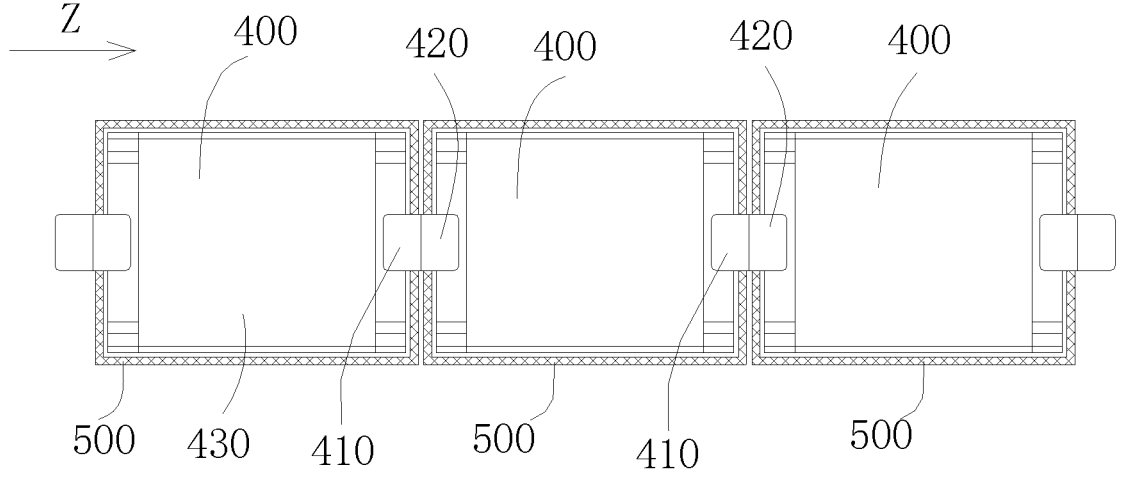
FIG. 19 is a schematic diagram of another structure in which electrode core assemblies are packaged with encapsulation films according to an embodiment of the present disclosure.

Referring to FIG. 1 to FIG. 4, a first embodiment of the present disclosure provides a battery pack 10, which includes a housing 100 and multiple electrode core strings 401 electrically connected to each other and arranged or disposed in the housing 100. The housing 100 is provided with a mounting component 104, and the mounting component 104 is configured to be connected and fixed to an external load. The housing 100 includes a housing body 113. The housing body 113 includes multiple sub-housings 101 connected to each other. At least one sub-housings 101 is provided with at least one reinforcing plate 200 inside the sub-housings 101. Each of the sub-housings 101 includes a top plate 102 and a bottom plate 103 oppositely arranged in a first direction. The reinforcing plate 200 is arranged between the top plate 102 and the bottom plate 103. The at least one reinforcing plate 200 is connected to the top plate 102 and the bottom plate 103, and divides an interior of the corresponding sub-housing 101 into multiple accommodating cavities 300. At least one accommodating cavity 300 is provided with at least one electrode core string 401 inside the accommodating cavity 300. The electrode core string 401 includes multiple electrode core assemblies 400 sequentially arranged in a second direction and connected in series. The electrode core assemblies 400 are packaged or disposed in an encapsulation film 500 (as shown in FIG. 18 or FIG. 19). A length of the electrode core string 401 extends in the second direction. The first direction is a height direction of the housing 100, and the second direction is a length direction of the housing 100 or a width direction of the housing 100. As shown in the figures, the first direction is an X direction in the figures, and the second direction is a Z direction in the figures.

Moreover, the housing 100 of the battery pack 10 in the embodiments of the present disclosure includes multiple sub-housings 101 connected to each other. The number of the sub-housings 101 can be selected according to the actual needs. In this way, the design flexibility and versatility of the battery pack 10 can be improved, thereby facilitating standardization, modularization, and mass production of the battery pack 10. Further, the reinforcing plate 200 in the present disclosure is arranged between the top plate 102 and the bottom plate 103, and the reinforcing plate 200 is connected to the top plate 102 and the bottom plate 103. Such a design enables the reinforcing plate 200, the top plate 102 and the bottom plate 103 form an I-shaped structure. This structure has high strength and stiffness, so that the housing 100 of the battery pack 10 has better performances such as load bearing, impact resistance and extrusion resistance. Furthermore, when the battery pack 10 is mounted on a vehicle, the structural strength of the battery pack 10 can be taken as a part of the structural strength of the vehicle. Therefore, the structural strength of the vehicle can be enhanced, which achieves the requirements of lightweight design of the electric vehicle, and also reduces the design and manufacturing costs of the vehicle. Besides, in the present disclosure, the electrode core assemblies 400 are packaged in the encapsulation film 500, multiple electrode core assemblies 400 are connected in series to form an electrode core string, 401, and the electrode core string 401 is arranged in the housing 100 of the battery pack 10, so as to achieve double seal through the encapsulation film 500 and the housing 100 of the battery pack 10, thereby improving the sealing effect. Furthermore, the electrode core string 401 used in the present disclosure eliminates a battery housing and structural members constituting a battery module, thereby improving the space utilization of the battery pack 10, reducing the weight of the battery pack 10, and improving the energy density of the battery pack 10. Moreover, the battery pack 10 in the present disclosure has a simple structure, a high assembly efficiency, and a low production cost.

In the present disclosure, each of the electrode core assemblies 400 includes at least one electrode core. When the electrode core assembly 400 includes two or more electrode cores, the electrode cores are connected in parallel.

The electrode cores mentioned in the present disclosure are electrode cores commonly used in the field of power batteries. The electrode cores and the electrode core assemblies 400 are components of a battery and shall not be understood as the battery itself. In addition, the electrode cores may be electrode cores formed by winding, or electrode cores made by lamination. In general, each electrode core at least includes a positive electrode sheet, a separator, and a negative electrode sheet.

In addition, the reinforcing plate 200 is connected to the top plate 102 and the bottom plate 103. It can be understood that the reinforcing plate 200 is integrally formed with the top plate 102 and the bottom plate 103; or the reinforcing plate 200, the top plate 102, and the bottom plate 103 are made separately, and are then connected directly or indirectly connected, which is not specifically limited in the present disclosure. The direct connection may be that one end of the reinforcing plate 200 is connected to the bottom plate 103, and the opposite end of the reinforcing plate 200 is connected to the top plate 102. The indirect connection may be that one end of the reinforcing plate 200 is connected to the bottom plate 103 through an intermediate plate, and the opposite end of the reinforcing plate 200 is connected to the top plate 102 through another intermediate plate.

In some embodiments, the at least one reinforcing plate 200 is joined to the top plate 102 and the bottom plate 103. It can be understood that the top plate 102, the bottom plate 103 and the reinforcing plate 200 are integrally formed; or one of the top plate 102 and the bottom plate 103 is integrally formed with the reinforcing plate 200, and the other is then welded with the reinforcing plate 200; or one end of the reinforcing plate 200 is welded with the bottom plate 103, and the opposite end of the reinforcing plate 200 is welded with the top plate 102. In an embodiment, one end of the reinforcing plate 200 is welded with the bottom plate 103, and the opposite end of the reinforcing plate 200 is then welded with the top plate 102.

It should be noted that the multiple electrode core strings 401 are electrically connected to each other. That is, the electrode core strings 401 in two adjacent accommodating cavities 300 are connected in series or in parallel; or the electrode core strings 401 in two spaced accommodating cavities 300 are connected in series or in parallel; or the electrode core strings 401 in three or more accommodating cavities 300 are connected in series or in parallel.

In addition, the number of the electrode core strings 401 in each accommodating cavity 300, and the number of the electrode core assemblies 400 included in each electrode core string 401 can be configured according to different power demands. Moreover, the number of the electrode core strings 401 in each accommodating cavity 300 may be the same or different. When the accommodating cavity 300 is provided with multiple electrode core strings 401, the electrode core strings 401 can be connected in series, in parallel, or in series and parallel.

Besides, the housing 100 of the battery pack 10 of the present disclosure is provided with a mounting component 104. The housing 100 of the battery pack 10 is detachably or non-detachably connected and fixed to an external load through the mounting component 104. In general, the housing 100 of the battery pack 10 needs to be connected and fixed to the external load, and therefore, there are special requirements for the performance thereof, such as impact resistance and extrusion resistance. Therefore, the housing 100 shall not simply be regarded as a housing 100 of a battery module or a cell. Generally, the battery pack 10 further includes at least one of a battery management system (BMS), a battery connector, a battery sampler, or a battery thermal management system.

Figure 2:
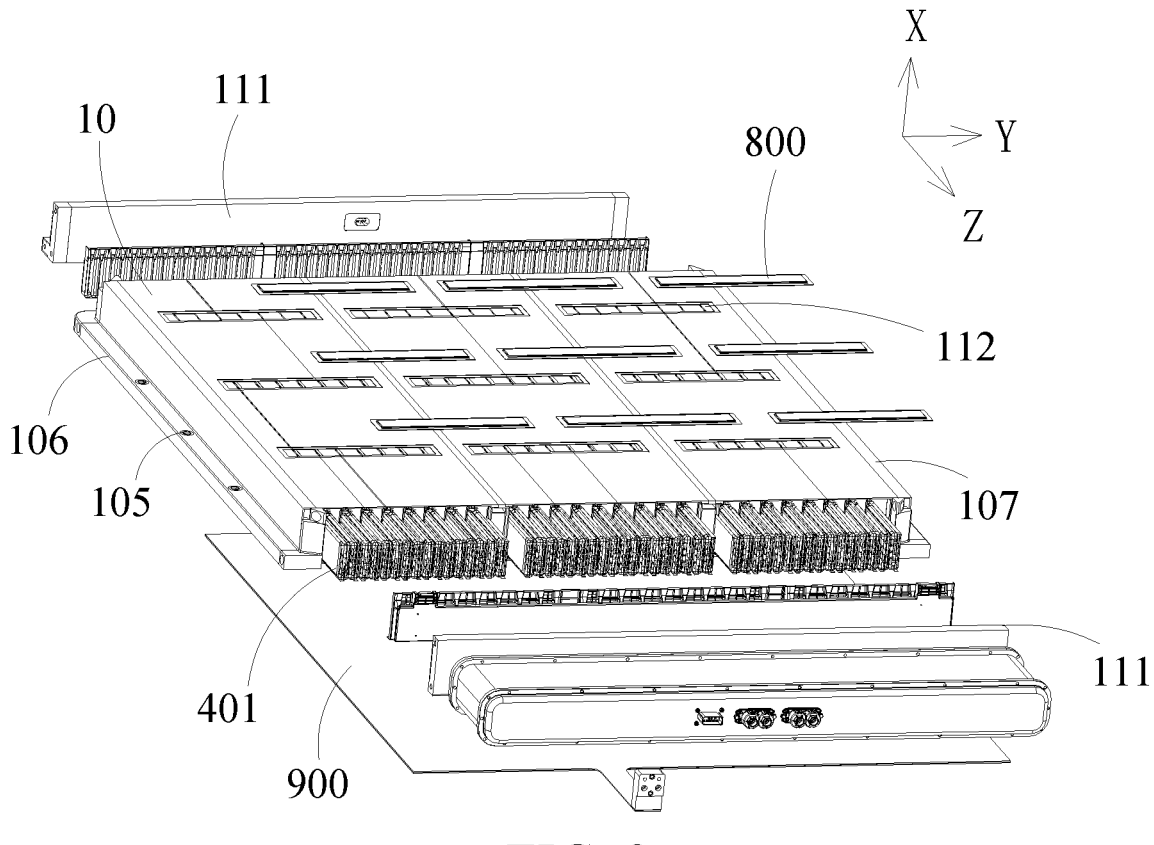
FIG. 2 is an exploded view of a battery pack according to an embodiment of the present disclosure.
Figure 3:
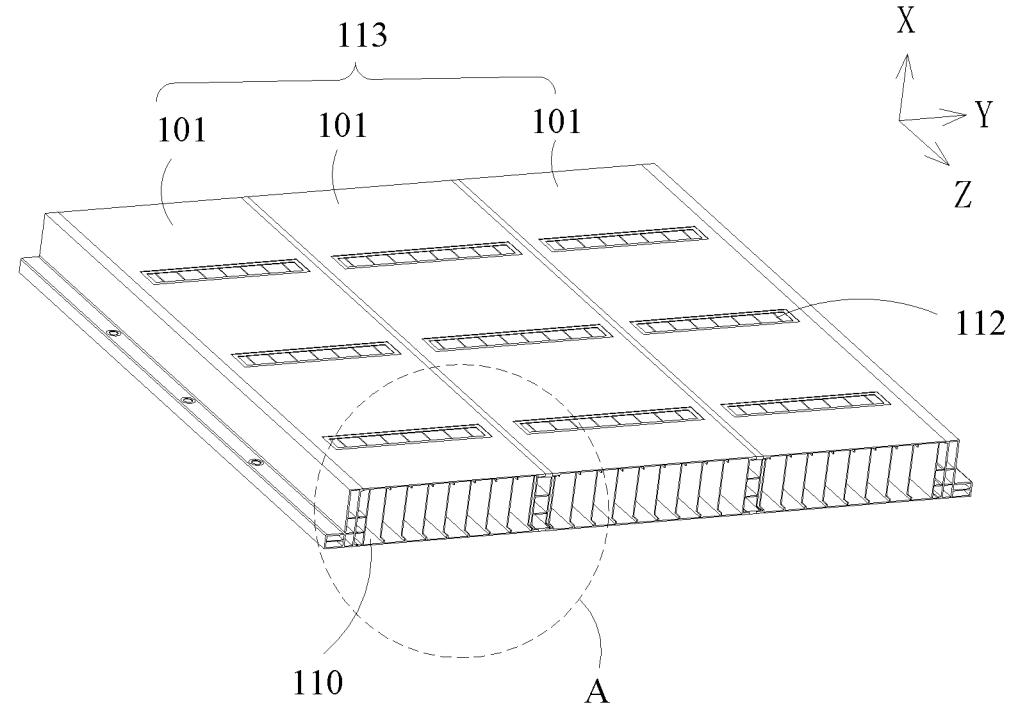
FIG. 3 is a schematic diagram of a structure of a housing according to an embodiment of the present disclosure.

In an embodiment, as shown in FIG. 1 to FIG. 3, the housing 100 further includes a first edge beam 106 and a second edge beam 107 disposed on two opposite sides of the housing body 113 in a third direction. The second direction is the length direction of the housing 100, and the third direction is the width direction of the housing 100; or the second direction is the width direction of the housing 100, and the third direction is the length direction of the housing 100.

Figure 4:
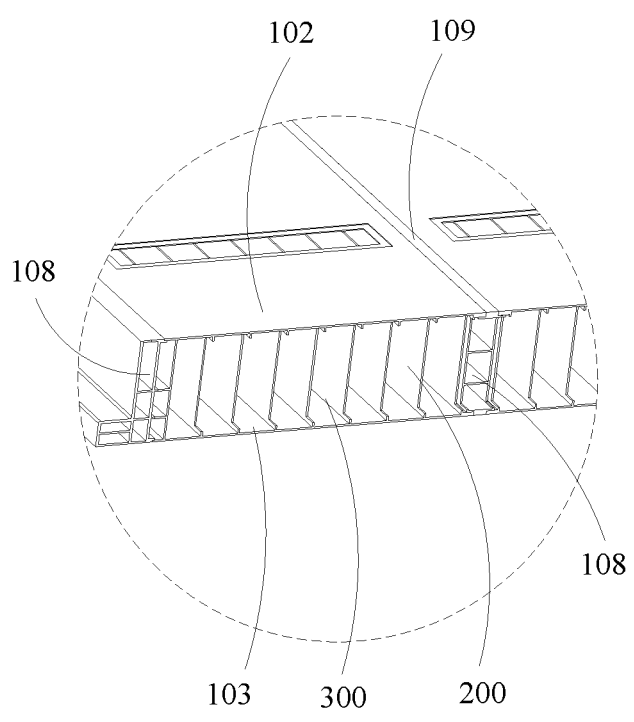
FIG. 4 is partial enlarged view of portion A in FIG. 3.
Figure 5:
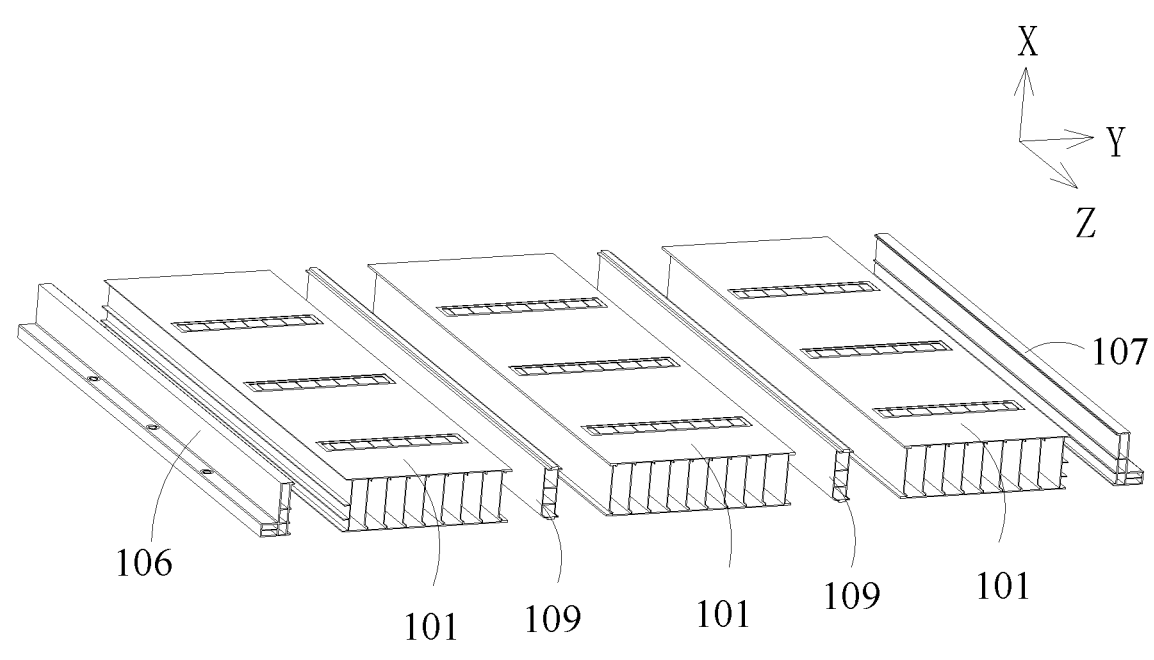
FIG. 5 is an exploded view of a housing according to an embodiment of the present disclosure.

In an embodiment, as shown in FIG. 3 to FIG. 5, the multiple sub-housings 101 are sequentially arranged in the third direction. The sub-housings 101 among the multiple sub-housings 101 on two ends in the third direction are end sub-housings. One of the two end sub-housings is connected to the first edge beam 106 and the other is connected to the second edge beam 107. The first sub-housing 101 and the last sub-housing 101 in a Y direction in FIG. 5 are the end sub-housings, respectively.

Further, the end sub-housing connected to the first edge beam 106 and the first edge beam 106 are integrally formed, and the end sub-housing connected to the second edge beam 107 and the second edge beam 107 are integrally formed. In this way, not only the processing technology can be simplified and the cost can be reduced, but also a sufficient structural strength can be ensured.

Specifically, at least one of the top plate 102 and the bottom plate 103 of the end sub-housing connected to the first edge beam 106 is integrally formed with the first edge beam 106, and at least one of the top plate 102 and the bottom plate 103 of the end sub-housing connected to the second edge beam 107 is integrally formed with the second edge beam 107, for example, by extrusion molding of integrated aluminum profiles.

However, in other embodiments, the end sub-housing connected to the first edge beam 106 is integrally formed with the first edge beam 106, and the end sub-housing connected to the second edge beam 107 is directly or indirectly connected to the second edge beam 107. In an embodiment, the end sub-housing connected to the second edge beam 107 is integrally formed with the second edge beam 107, and the end sub-housing connected to the first edge beam 106 is directly or indirectly connected to the first edge beam 106.

In an embodiment, as shown in FIG. 3 to FIG. 5, each of the first edge beam 106 and the second edge beam 107 is provided internally with a cavity having partition plates 108, and the partition plates 108 divide the cavity into multiple sub-cavities. This structure can ensure that the first edge beam 106 and the second edge beam 107 have a certain structural strength, thereby improving the impact resistance and extrusion resistance strength of the battery pack 10. However, in other embodiments, the first edge beam 106 or the second edge beam 107 is provided with a cavity.

In an embodiment, as shown in FIG. 3 to FIG. 5, the housing body 113 further includes a connecting plate 109, and the connecting plate 109 is connected between two adjacent sub-housings 101. The connection mode is not specifically limited in the present disclosure, and may be a detachable connection, such as a bolt connection and riveting, or a non-detachable connection, such as welding and bonding.

In an embodiment, the connecting plate 109 is provided with a cavity having partition plates 108, and the partition plates 108 divide the cavity into multiple sub-cavities. This arrangement can increase the structural strength of the connecting plate 109, thereby improving the reliability of the connection between two sub-housings 101.

In an embodiment, as shown in FIG. 3 to FIG. 5, each of the sub-housings 101 is provided with multiple reinforcing plates 200. The multiple reinforcing plates 200 are spaced apart in the third direction. A length of each reinforcing plate 200 extends in the second direction. Each reinforcing plate 200 is connected to the top plate 102 and the bottom plate 103. The third direction is different from the first direction and the second direction. In this embodiment, each sub-housing 101 is provided with multiple reinforcing plates 200. In other embodiments, according to the actual needs, it is also possible that some of the sub-housings 101 are provided with multiple reinforcing plates 200.

In the present disclosure, the first direction is the height direction of the housing 100, the second direction is the width direction of the housing 100, and the third direction is the length direction of the housing 100; or the second direction is the length direction of the housing 100, and the third direction is the width direction of the housing 100. The first direction is an X direction in the figures, the second direction is a Z direction in the figures, and the third direction is a Y direction in the figures.

However, in other embodiments, the first direction, the second direction, and the third direction can also be set at other angles with each other, such as 80° or 85°, which are not specifically limited in the present disclosure.

It should be noted that the reinforcing plates 200 are connected to the top plate 102 and the bottom plate 103. It can be understood that the reinforcing plates 200 are integrally formed with the top plate 102 and the bottom plate 103; or the reinforcing plates 200, the top plate 102, and the bottom plate 103 are made separately, and are then directly or indirectly connected, which is not specifically limited in the present disclosure.

In some embodiments, at least one of the top plate 102 and the bottom plate 103 is integrally formed with the reinforcing plates 200. This arrangement not only simplifies the processing technology and reduces the production cost, but also can ensure that the housing 100 has sufficient structural strength and stiffness to meet the requirements of the housing 100 for performances such as load bearing, impact resistance and extrusion resistance.

Specifically, the top plate 102, the bottom plate 103, and the reinforcing plates 200 are integrally formed, for example, by extrusion molding of integrated aluminum profiles. In another embodiment, the bottom plate 103 is integrally formed with the reinforcing plates 200, and the top plate 102 is then welded with the reinforcing plates 200. In an embodiment, the top plate 102 is integrally formed with the reinforcing plates 200, and the bottom plate 103 is then welded with the reinforcing plates 200.

It can be understood that, when each reinforcing plate 200 is connected to the top plate 102 and the bottom plate 103, each reinforcing plate 200, the top plate 102 and the bottom plate 103 form an I-shaped structure. This structure has high strength and stiffness, and can meet the requirements of the housing 100 for the performances such as load bearing, impact resistance and extrusion resistance. Moreover, the housing 100 has a relatively simple structure and a high space utilization. Furthermore, when the battery pack 10 is mounted on a vehicle, the structural strength of the battery pack 10 can be taken as a part of the structural strength of the vehicle. Therefore, the structural strength of the vehicle can be enhanced, which achieves the requirements of a lightweight electric vehicle, and also reduces the design and manufacturing costs of the vehicle.

In further embodiments, the first edge beam 106 and the second edge beam 107 are provided with mounting components 104, and the mounting components 104 are configured to be connected and fixed to an external load.

In other embodiments, the mounting components 104 can also be arranged on the top plate 102 or the bottom plate 103.

In an embodiment, as shown in FIG. 1 and FIG. 2, the mounting components 104 are mounting holes 105 provided on the first edge beam 106 and the second edge beam 107. The mounting holes 105 are configured to allow the fasteners (such as bolts or rivets) to pass through, to connect or fix the battery pack 10 to the external load.

Specifically, the mounting holes 105 provided on the first edge beam 106 pass through the first edge beam 106 in the first direction, and the mounting holes 105 provided on the second edge beam 107 pass through the second edge beam 107 in the first direction. However, an axial direction of the mounting holes 105 can also be set at an angle with respect to the first direction, such as, 5° or 10°.

Further, there are multiple mounting holes 105. The mounting holes 105 provided on the first edge beam 106 are sequentially arranged in a length direction of the first edge beam 106. The length direction of the first edge beam 106 is parallel to the second direction.

Similarly, the mounting holes 105 provided on the second edge beam 107 are sequentially arranged in a length direction of the second edge beam 107. The length direction of the second edge beam 107 is parallel to the second direction.

In another embodiment, the mounting components 104 are hanging rings arranged on the first edge beam 106 and the second edge beam 107. The hanging rings are fixedly connected to the external load to connect and fix the battery pack 10 to the external load.

However, in another embodiment, the mounting components 104 are mounting blocks arranged on the first edge beam 106 and the second edge beam 107. The mounting blocks can be fixed to the external load through welding, gluing, or snap-fit.

In an embodiment, lengths of the accommodating cavities 300 in the second direction may be greater than 500 mm, or 500 mm to 2500 mm. This design enables lengths of the electrode core strings 401 arranged in the accommodating cavities 300 to be longer, that is, more electrode core assemblies 400 can be accommodated, so that the battery pack 10 can meet the requirements of a larger capacity and higher space utilization.

Further, the lengths of the accommodating cavities 300 in the second direction may be 1000 mm to 2000 mm or 1300 mm to 2200 mm.

Figure 6:
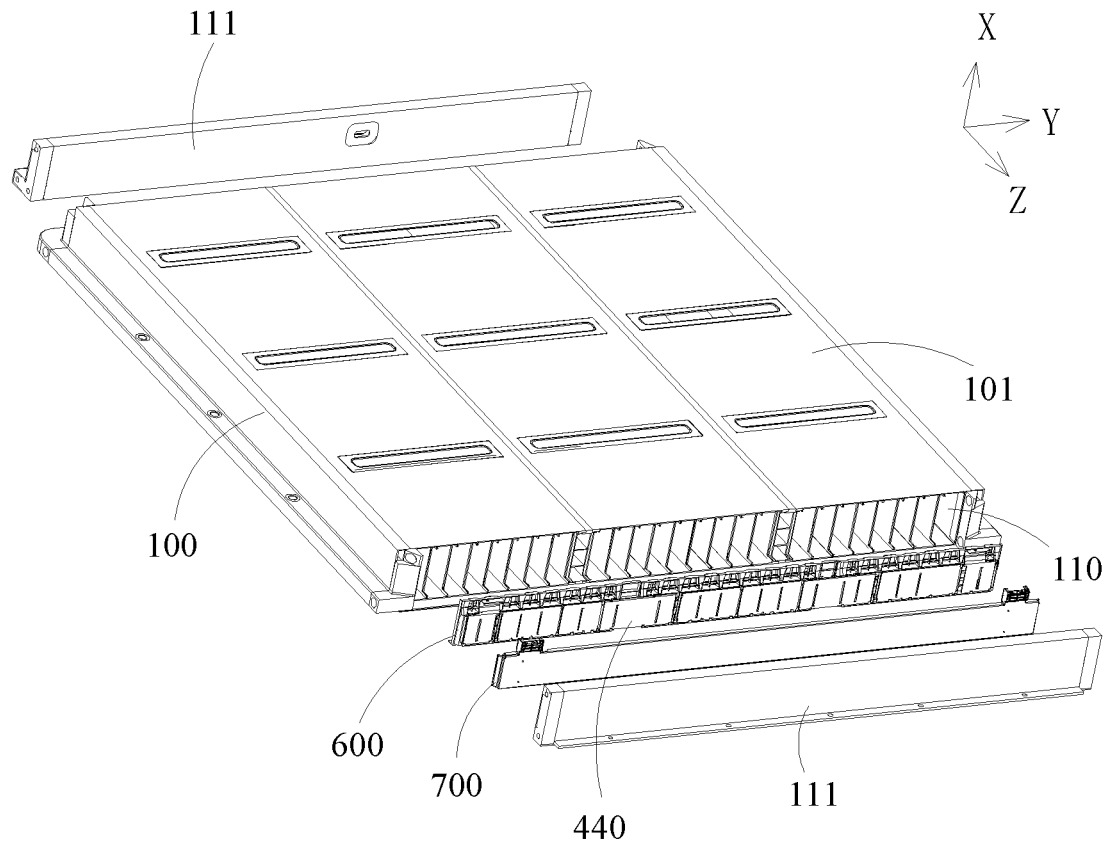
FIG. 6 is an exploded view of a partial structure of a battery pack according to an embodiment of the present disclosure.
Figure 7:
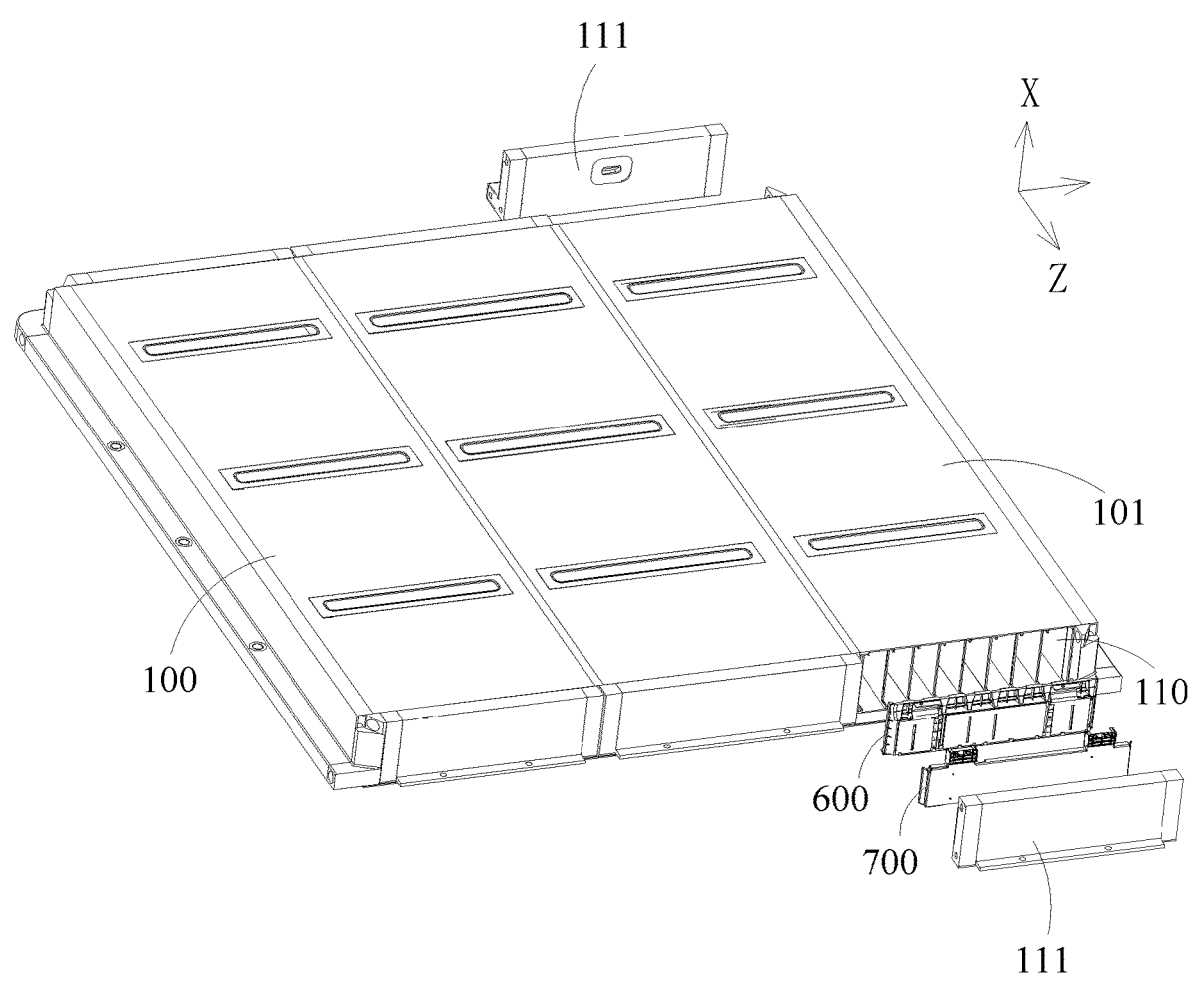
FIG. 7 is an exploded view of a partial structure of another battery pack according to an embodiment of the present disclosure.
Figure 8:
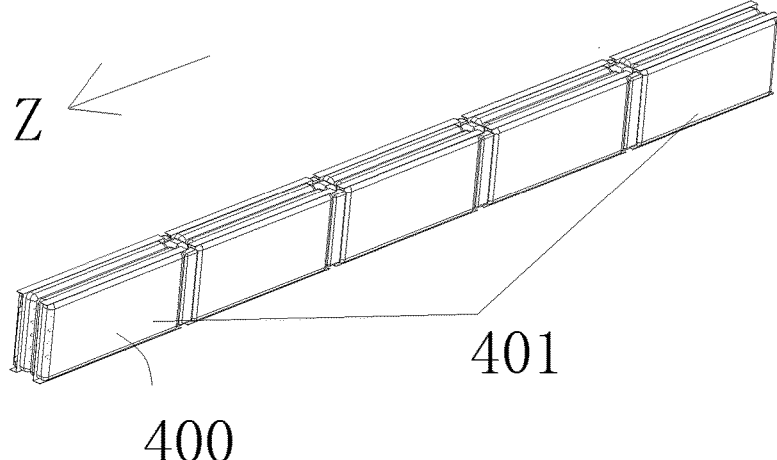
FIG. 8 is a schematic diagram of a structure of an electrode core string according to an embodiment of the present disclosure.

In some embodiments, as shown in FIG. 2, FIG. 6 and FIG. 7, each of the sub-housings 101 has a first end and a second end opposite in the second direction. At least one of the first end and the second end of the sub-housing 101 is provided with openings 110. The housing 100 further includes end plates 111 closing or sealing the openings 110.

Each opening 110 corresponds to at least one end plate 111. With this arrangement, during replacement or maintenance, only the end plates 111 corresponding to the openings 110 of the sub-housings 101 need to be removed, thereby simplifying the operation.

It can be understood that the electrode core strings 401 can be mounted or disposed in the accommodating cavities 300 through the openings 110 of the sub-housings 101. This mounting mode is relatively easy to operate and can ensure that the sub-housings 101 have a high structural strength.

A mode in which the end plates 111 close the openings 110 of the sub-housings 101 is not specifically limited. For example, the end plates 111 are welded with the sub-housings 101 to close the openings 110 of the sub-housing 101; or the end plates 111 are bonded to the sub-housings 101 to close the openings 110 of the sub-housings 101; or the end plates 111 are riveted or screwed to the sub-housings 101, and gaskets are arranged between the end plates 111 and the sub-housings 101 to close the openings 110 of the sub-housings 101.

In this embodiment, both the first end and the second end of each sub-housing 101 are provided with openings 110, and each opening 110 respectively corresponds to one end plate 111. In other embodiments, each opening 110 can also correspond to multiple end plates 111, that is, the multiple end plates 111 close one opening 110 of the sub-housing 101.

Further, as shown in FIG. 3 and FIG. 6, the multiple end plates 111 on the same end of the housing body 113 in the second direction are integrally formed. That is, the multiple end plates 111 on the first end of the housing body 113 are integrally formed, and/or, the multiple end plates 111 on the second end of the housing body 113 are integrally formed. This arrangement can simplify the processing of the end plates 111, thereby saving the cost.

In some embodiments, as shown in FIG. 2, FIG. 6 and FIG. 7, the battery pack 10 further includes multiple insulating supports 600 on the inner sides of the end plates 111. The insulating supports 600 are arranged or disposed at the openings 110 on at least one of the first ends and the second ends of the sub-housings 101. Two electrode core assemblies 400 at the openings 110 on the same end of the sub-housings 101 in the second direction and respectively in two adjacent accommodating cavities 300 are electrically connected through first conductive members 440. The first conductive members 440 are fixed on the insulating supports 600. With this arrangement, during maintenance or replacement, only the insulating supports 600 corresponding to the sub-housings 101 need to be removed, thereby simplifying the operation. Moreover, each insulating support 600 can fix, support and insulate the first conductive member 440 arranged thereon.

In this embodiment, an insulating support 600 is arranged at the opening 110 on the first end or the second end of each sub-housing 101.

The inner sides of the end plates 111 can be understood as sides of the end plates 111 close to the electrode core assemblies 400. The first conductive members 440 may be connecting sheets, or in other shapes, such as a post shape.

In further embodiments, as shown in FIG. 3 and FIG. 6, the multiple insulating supports 600 on the same end of the housing body 113 in the second direction are integrally formed. That is, the multiple insulating supports 600 on the first end of the housing body 113 are integrally formed, and/or, the multiple insulating supports 600 on the second end of the housing body 113 are integrally formed. This arrangement can simplify the processing of the insulating supports 600, thereby saving the cost.

In some embodiments, the first conductive members 440 are arranged on sides of the insulating supports 600 facing away from the electrode core assemblies 400. Each of the electrode core assemblies 400 includes a first electrode lead-out member 410 and a second electrode lead-out member 420 configured to lead out currents. The first electrode lead-out member 410 and the second electrode lead-out member 420 are disposed on two opposite sides of the electrode core assembly 400 in the second direction. The first electrode lead-out member 410 of one of two electrode core assemblies 400 at the openings 110 on the same end of the sub-housings 101 in the second direction and respectively in two adjacent accommodating cavities 300 and the first electrode lead-out member 410 of the other electrode core assembly 400 pass through the insulating supports 600 and the first conductive members 440 and are electrically connected through the first conductive members 440, to achieve a parallel connection of the electrode core assemblies 400 in the two adjacent accommodating cavities 300. Moreover, a connection path for this connection mode is relatively short, thereby reducing the internal resistance.

In some other embodiments, the second electrode lead-out member 420 of one of two electrode core assemblies 400 at the openings 110 on the same end of the sub-housings 101 in the second direction and respectively in two adjacent accommodating cavities 300 and the second electrode lead-out member 420 of the other electrode core assembly 400 pass through the insulating supports 600 and the first conductive members 440 and are electrically connected through the first conductive members 440, to achieve parallel connection of the electrode core assemblies 400 in the two adjacent accommodating cavities 300. Moreover, a connection path for this connection mode is relatively short, thereby reducing the internal resistance.

In some other embodiments, the first electrode lead-out member 410 of one of two electrode core assemblies 400 at the openings 110 on the same end of the sub-housings 101 in the second direction and respectively in two adjacent accommodating cavities 300 and the second electrode lead-out member 420 of the other electrode core assembly 400 pass through the insulating supports 600 and the first conductive members 440 and are electrically connected through the first conductive members 440, to achieve the parallel connection of the electrode core assemblies 400 in the two adjacent accommodating cavities 300. Moreover, a connection path for this connection mode is relatively short, thereby reducing the internal resistance.

In further embodiments, as shown in FIG. 2, FIG. 6 and FIG. 7, the battery pack 10 further includes multiple insulating protective covers 700. The insulating protective covers 700 are arranged between the insulating supports 600 and the end plates 111. The insulating protective covers 700 can protect the first conductive members 440 fixed on the insulating supports 600, to prevent damage to the first conductive members 440 and joints between the first conductive members 440 and the first electrode lead-out members 410 or the second electrode lead-out members 420, and also prevent a short circuit due to the contact between the first conductive members 440 and other metal members.

In further embodiments, as shown in FIG. 3 and FIG. 6, the multiple insulating protective covers 700 on the same end of the housing body 113 in the second direction are integrally formed. That is, the multiple insulating protective covers 700 on the first end of the housing body 113 are integrally formed, and/or, the multiple insulating protective covers 700 on the second end of the housing body 113 are integrally formed. This arrangement can simplify the processing of the insulating protective covers 700, thereby saving the cost.

In an embodiment, as shown in FIG. 7, lengths of the electrode core strings 401 may be greater than 400 mm, 400 mm to 2500 mm, 1000 mm to 2000 mm, or 1300 mm to 2200 mm. It can be understood that arranging multiple electrode core assemblies 400 that connected in series to form an electrode core string 401 in an accommodating cavity 300 can reduce the internal resistance as compared with the existing mode in which only one electrode core assembly 400 having the same length as the electrode core string 401 is arranged. Because when the electrode core assembly 400 is longer, the length of a copper-aluminum foil used as a current collector increases accordingly, which greatly increases the internal resistance and cannot meet the current requirements for a higher power and fast charging. However, the above-mentioned problem can be prevented by using the mode of connecting the multiple electrode core assemblies 400 in series in the present disclosure.

Figure 9:
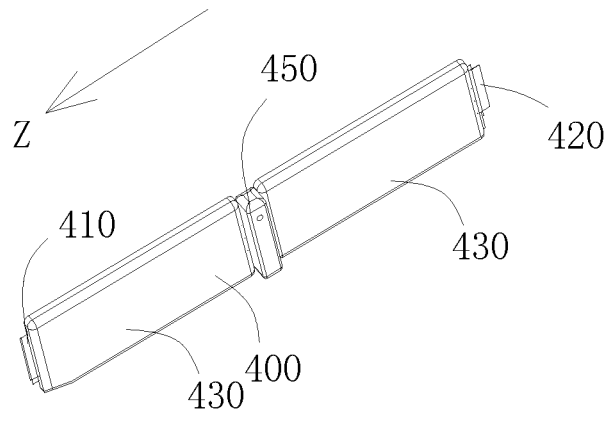
FIG. 9 is a schematic diagram of a structure in which electrode core assemblies and a fixing spacer are connected according to an embodiment of the present disclosure.
Figure 10:
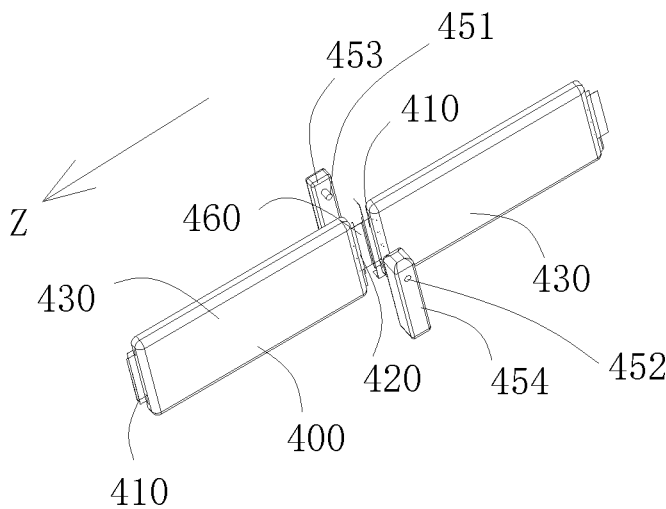
FIG. 10 is an exploded view of FIG. 9.

Referring to FIG. 9 and FIG. 10, in further embodiments, each of the electrode core assemblies 400 includes a first electrode lead-out member 410 and a second electrode lead-out member 420 configured to lead out currents. The first electrode lead-out member 410 and the second electrode lead-out member 420 are disposed on two opposite sides of the electrode core assembly 400 in the second direction. The first electrode lead-out member 410 of one of two adjacent electrode core assemblies 400 in the electrode core string 401 is electrically connected to and the second electrode lead-out member 420 of the other electrode core assembly 400, so that the two adjacent electrode core assemblies 400 are connected in series. That is, the multiple electrode core assemblies 400 constituting the electrode core string 401 are arranged in the mode of end-to-end connection. This arrangement mode can more conveniently achieve pairwise series connections between the electrode core assemblies 400, so that the connection structure is simple.

In an embodiment, as shown in FIG. 2 to FIG. 4, each of the accommodating cavities 300 is provided with multiple electrode core strings 401. The multiple electrode core strings 401 are sequentially arranged and electrically connected in a thickness direction of the electrode core assemblies 400. The thickness direction of the electrode core assemblies 400 is parallel to the third direction. In this way, more electrode core strings 401 can be arranged in the accommodating cavity 300 to meet the requirements of the actual use.

The following specifically introduces several cases in which the multiple electrode core strings 401 in the same accommodating cavity 300 are electrically connected. It should be noted that the following are merely examples, and the implementations of the present disclosure are not limited thereto.

Figure 11:
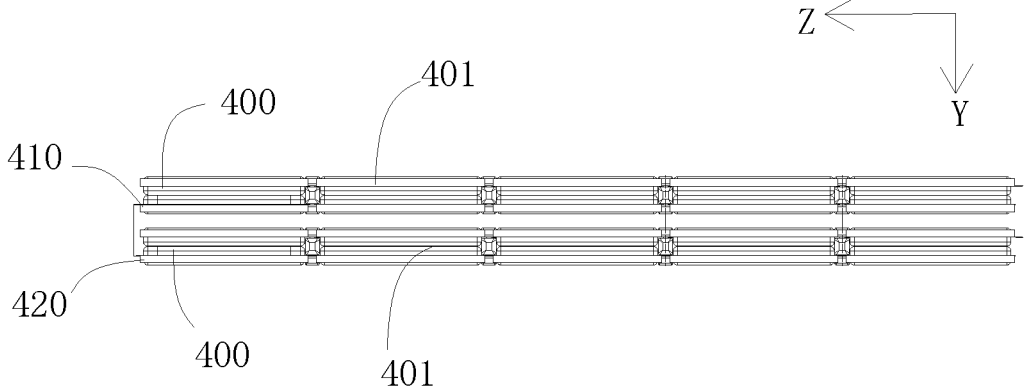
FIG. 11 is a schematic diagram of a structure in which two electrode core strings in the same accommodating cavity are connected in series according to an embodiment of the present disclosure.
Figure 12:
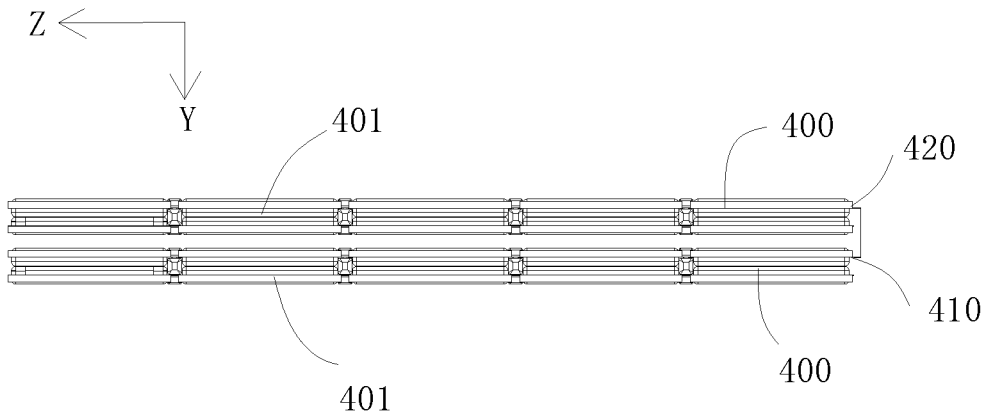
FIG. 12 is a schematic diagram of another structure in which two electrode core strings in the same accommodating cavity are connected in series according to an embodiment of the present disclosure.

Referring to FIG. 11 and FIG. 12, in further embodiments, the multiple electrode core strings 401 in the same accommodating cavity 300 are connected in series.

The first electrode core assembly 400 in one of two adjacent electrode core strings 401 is electrically connected to the first electrode core assembly 400 in the other electrode core string 401. In an embodiment, the last electrode core assembly 400 in one of two adjacent electrode core strings 401 is electrically connected to the last electrode core assembly 400 in the other electrode core string 401. As shown in FIG. 11 and FIG. 12, the leftmost one of the two electrode core strings 401 is the first electrode core assembly 400, and the rightmost one is the last electrode core assembly 400.

Further, the first electrode lead-out member 410 in the first electrode core assembly 401 in one of two adjacent electrode core strings 401 and the second electrode lead-out member 420 of the first electrode core assembly 400 of the other electrode core string 401 are arranged on the same side (as shown in FIG. 11). In an embodiment, the second electrode lead-out member 420 of the last electrode core assembly 400 in one of two adjacent electrode core strings 401 and the first electrode lead-out member 410 of the last electrode core assembly 400 of the other electrode core string 401 are arranged on the same side (as shown in FIG. 12).

The above-mentioned connection mode to connect the multiple electrode core strings 401 in the same accommodating cavity 300 in series can shorten a path for the electrical connection and reduce the internal resistance. In other embodiments, other series connection modes can also be used.

Figure 13:
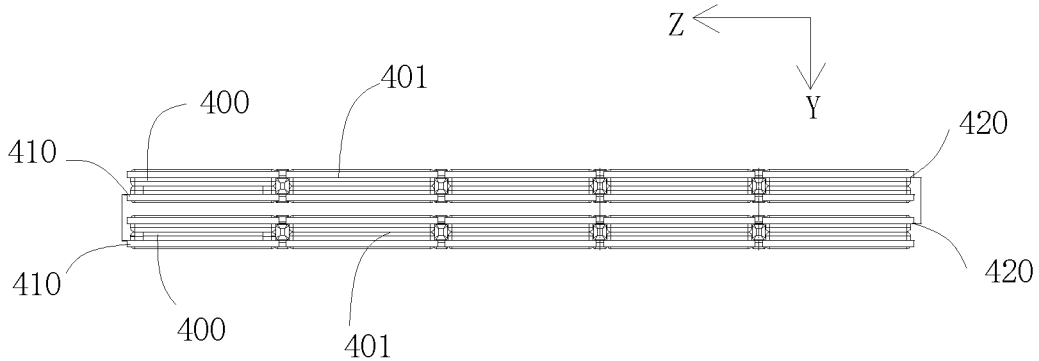
FIG. 13 is a schematic diagram of a structure in which two electrode core strings in the same accommodating cavity are connected in parallel according to an embodiment of the present disclosure.

Referring to FIG. 13, in further embodiments, the multiple electrode core strings 401 in the same accommodating cavity 300 are connected in parallel.

The first electrode core assembly 400 of one of two adjacent electrode core strings 401 is electrically connected to the first electrode core assembly 400 of the other electrode core string 401, and the last electrode core assembly 400 of one of the two adjacent electrode core strings 401 is electrically connected to the last electrode core assembly 400 of the other electrode core string 401. As shown in FIG. 13, the leftmost one of the two electrode core strings 401 is the first electrode core assembly 400, and the rightmost one is the last electrode core assembly 400.

Further, the first electrode lead-out member 410 of the first electrode core assembly 400 of one of two adjacent electrode core strings 401 and the first electrode lead-out member 410 of the first electrode core assembly 400 of the other electrode core string 401 are arranged on the same side, and the second electrode lead-out member 420 of the last electrode core assembly 400 of one of the two adjacent electrode core strings 401 and the second electrode lead-out member 420 of the last electrode core assembly 400 of the other electrode core string 401 are arranged on the same side.

The above-mentioned connection mode to connect the multiple electrode core strings 401 in the same accommodating cavity 300 in parallel can shorten a path for the electrical connection and reduce the internal resistance. In other embodiments, other parallel connection modes can also be used.

Further, the following specifically introduces several cases in which the electrode core strings 401 in two adjacent accommodating cavities 300 are electrically connected. It should be noted that the following are merely examples, and the implementations of the present disclosure are not limited thereto.

Figure 14:
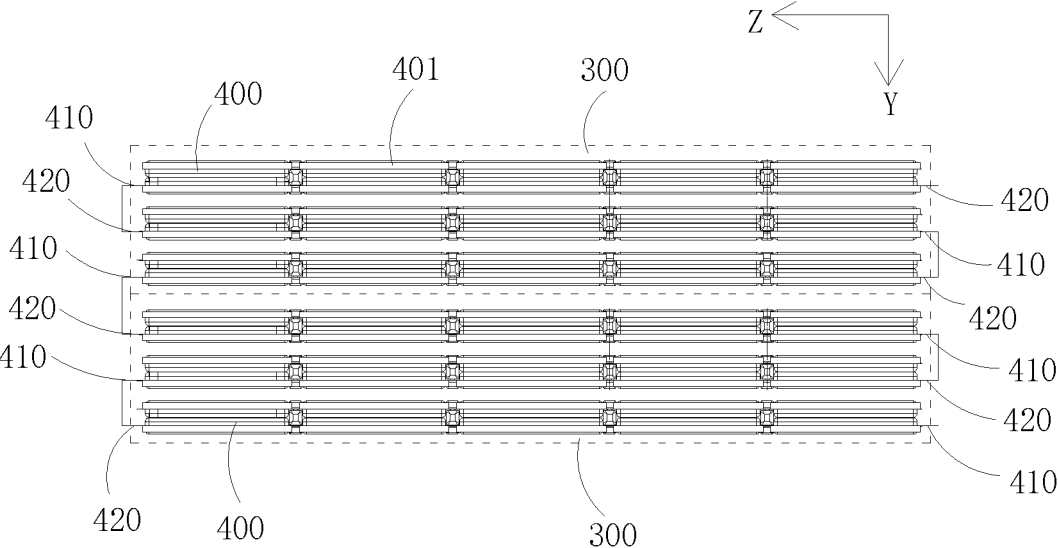
FIG. 14 is a schematic diagram of a structure in which two electrode core strings in two accommodating cavities are connected in series according to an embodiment of the present disclosure.

Referring to FIG. 14, in further embodiments, the electrode core strings 401 in two adjacent accommodating cavities 300 are connected in series.

The first electrode core assembly 400 of one of the electrode core strings 401 in one of the two adjacent accommodating cavities 300 is electrically connected to the first electrode core assembly 400 of one of the electrode core strings 401 in the other accommodating cavity 300; or the last electrode core assembly 400 of one of the electrode core strings 401 in one of the two adjacent accommodating cavities 300 is electrically connected to the last electrode core assembly 400 of one of the electrode core strings 401 in the other accommodating cavity 300. In FIG. 14, the first electrode core assembly 400 in the electrode core string 401 is the leftmost electrode core assembly 400, and the last electrode core assembly 400 of the electrode core string 401 is the rightmost electrode core assembly 400. In an embodiment, the first electrode core assembly 400 in the electrode core string 401 is the rightmost electrode core assembly 400, and the last electrode core assembly 400 of the electrode core string 401 is the leftmost electrode core assembly 400. FIG. 14 shows a case where each accommodating cavity 300 includes three electrode core strings 401, and two electrode core strings 401 in two different accommodating cavities 300 and adjacent to each other are electrically connected. In other embodiments, each accommodating cavity 300 may include one electrode core string 401, or the number of the electrode core strings 401 may be different than three. When each accommodating cavity 300 includes multiple electrode core strings 401, the first electrode core string 401 in one accommodating cavity 300 in the third direction can be electrically connected to the second electrode core string 401 in the other accommodating cavity 300 in the third direction. That is, the two electrode core strings 401 in the two different accommodating cavities 300 and not adjacent to each other are electrically connected.

In further embodiments, the first electrode lead-out member 410 of the first electrode core assembly 400 of one of the electrode core strings 401 in one of two adjacent accommodating cavities 300 and the second electrode lead-out member 420 of the first electrode core assembly 400 of one of the electrode core strings 401 in the other accommodating cavity 300 are arranged on the same side.

In an embodiment, the first electrode lead-out member 410 of the last electrode core assembly 400 of one of the electrode core strings 401 in one of two adjacent accommodating cavities 300 and the second electrode lead-out member 420 of the last electrode core assembly 400 of one of the electrode core strings 401 in the other accommodating cavity 300 are arranged on the same side.

The above-mentioned connection mode to connect the electrode core strings 401 in two adjacent accommodating cavities 300 in series can shorten a path for the electrical connection and reduce the internal resistance. In other embodiments, other series connection modes can also be used.

In some embodiments, two adjacent accommodating cavities 300 are respectively defined as a first accommodating cavity 300 and a second accommodating cavity 300. An electrode core string 401 arranged in the first accommodating cavity 300 adjacent to the second accommodating cavity 300 is connected in series to an electrode core string 401 arranged in the second accommodating cavity 300 adjacent to the first accommodating cavity 300.

Further, the first electrode core assembly 400 of an electrode core string 401 arranged in the first accommodating cavity 300 adjacent to the second accommodating cavity 300 is electrically connected to the first electrode core assembly 400 of an electrode core string 401 arranged in the second accommodating cavity 300 adjacent to the first accommodating cavity 300.

In an embodiment, the last electrode core assembly 400 of an electrode core string 401 arranged in the first accommodating cavity 300 adjacent to the second accommodating cavity 300 is electrically connected to the last electrode core assembly 400 of an electrode core string 401 arranged in the second accommodating cavity 300 adjacent to the first accommodating cavity 300.

It can be understood that the above-mentioned connection mode can shorten a path for the electrical connection and reduce the internal resistance.

Figure 15:
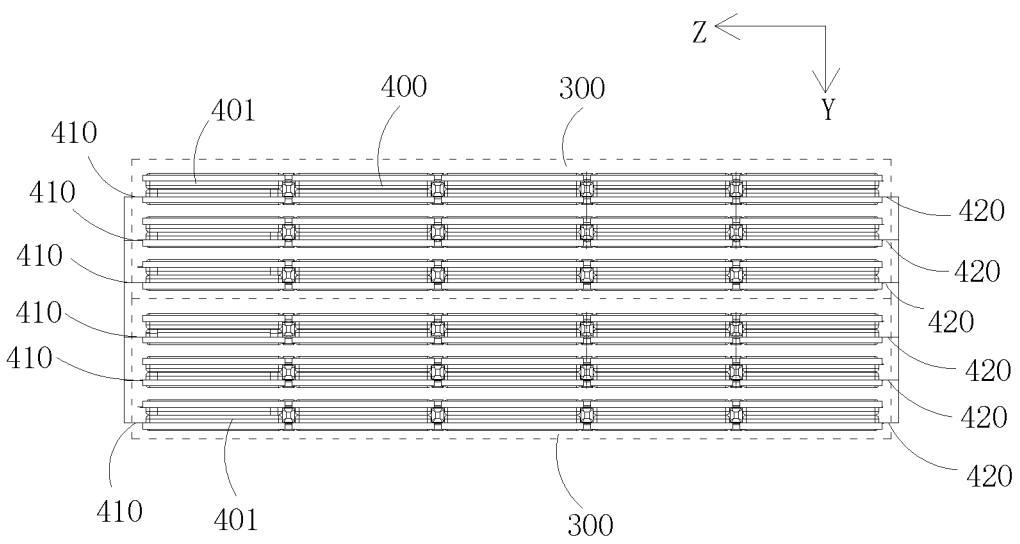
FIG. 15 is a schematic diagram of a structure in which two electrode core strings in two accommodating cavities are connected in parallel according to an embodiment of the present disclosure.

Referring to FIG. 15, in further embodiments, the electrode core strings 401 in two adjacent accommodating cavities 300 are connected in parallel.

Specifically, the first electrode core assembly 400 of one of the electrode core strings 401 in one of the two adjacent accommodating cavities 300 is electrically connected to the first electrode core assembly 400 of one of the electrode core strings 401 in the other accommodating cavity 300, and the last electrode core assembly 400 of one of the electrode core strings 401 in one of the two adjacent accommodating cavities 300 is electrically connected to the last electrode core assembly 400 of one of the electrode core strings 401 in the other accommodating cavity 300. In FIG. 15, the first electrode core assembly 400 in the electrode core string 401 is the leftmost electrode core assembly 400, and the last electrode core assembly 400 of the electrode core string 401 is the rightmost electrode core assembly 400. In an embodiment, the first electrode core assembly 400 in the electrode core string 401 is the rightmost electrode core assembly 400, and the last electrode core assembly 400 of the electrode core string 401 is the leftmost electrode core assembly 400.

Further, the first electrode lead-out member 410 of the first electrode core assembly 400 of one of the electrode core strings 401 in one of two adjacent accommodating cavities 300 and the first electrode lead-out member 410 of the first electrode core assembly 400 of one of the electrode core strings 401 in the other accommodating cavity 300 are arranged on the same side, and the second electrode lead-out member 420 of the last electrode core assembly 400 of one of the electrode core strings 401 in one of the two adjacent accommodating cavities 300 and the second electrode lead-out member 420 of the last electrode core assembly 400 of one of the electrode core strings 401 in the other accommodating cavity 300 are arranged on the same side.

The above-mentioned connection mode to connect the electrode core strings 401 in two adjacent accommodating cavities 300 in parallel can shorten a path for the electrical connection and reduce the internal resistance. In other embodiments, other parallel connection modes can also be used.

In an embodiment, two adjacent accommodating cavities 300 are respectively defined as a first accommodating cavity 300 and a second accommodating cavity 300. An electrode core string 401 arranged in the first accommodating cavity 300 adjacent to the second accommodating cavity 300 is connected in parallel to an electrode core string 401 arranged in the second accommodating cavity 300 adjacent to the first accommodating cavity 300.

Specifically, the first electrode core assembly 400 of an electrode core string 401 arranged in the first accommodating cavity 300 adjacent to the second accommodating cavity 300 is electrically connected to the first electrode core assembly 400 of an electrode core string 401 arranged in the second accommodating cavity 300 adjacent to the first accommodating cavity 300, and the last electrode core assembly 400 of an electrode core string 401 arranged in the first accommodating cavity 300 adjacent to the second accommodating cavity 300 is electrically connected to the last electrode core assembly 400 of an electrode core string 401 arranged in the second accommodating cavity 300 adjacent to the first accommodating cavity 300. It can be understood that the above-mentioned connection mode can shorten a path for the electrical connection and reduce the internal resistance.

A mode in which each accommodating cavity 300 is provided with one electrode core string 401, and the electrode core strings 401 in two adjacent accommodating cavities 300 are electrically connected is similar to the above-mentioned mode. The following is only a brief introduction.

Figure 16:
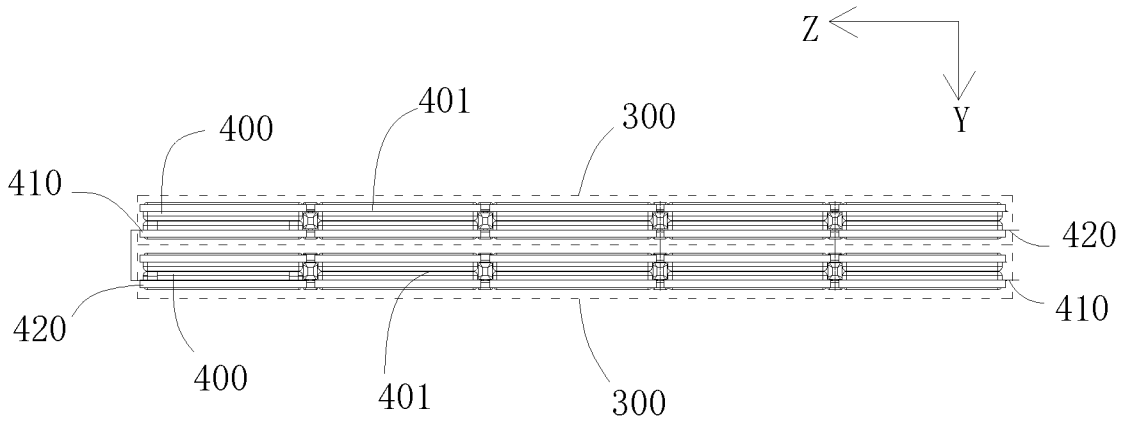
FIG. 16 is a schematic diagram of another structure in which two electrode core strings in two accommodating cavities are connected in series according to an embodiment of the present disclosure.

In some embodiments, as shown in FIG. 16, each accommodating cavity 300 is provided with only one electrode core string 401. In this case, the mode in which the electrode core strings 400 in two adjacent accommodating cavities 300 are connected in series is as follows: the first electrode core assembly 400 of the electrode core string 401 in one of two adjacent accommodating cavities 300 is electrically connected to the first electrode core assembly 400 of the electrode core string 401 in the other accommodating cavity 300; or the last electrode core assembly 400 of the electrode core string 401 in one of the two adjacent accommodating cavities 300 is electrically connected to the last electrode core assembly 400 of the electrode core string 401 in the other accommodating cavity 300. In FIG. 16, the first electrode core assembly 400 in the electrode core string 401 is the leftmost electrode core assembly 400, and the last electrode core assembly 400 of the electrode core string 401 is the rightmost electrode core assembly 400. In an embodiment, the first electrode core assembly 400 in the electrode core string 401 is the rightmost electrode core assembly 400, and the last electrode core assembly 400 of the electrode core string 401 is the leftmost electrode core assembly 400.

Figure 17:
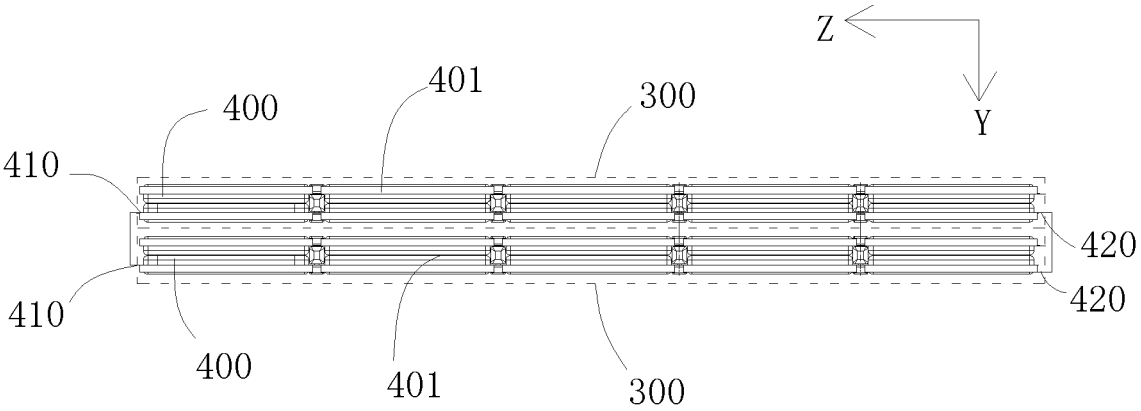
FIG. 17 is a schematic diagram of another structure in which two electrode core strings in two accommodating cavities are connected in parallel according to an embodiment of the present disclosure.

In some embodiments, as shown in FIG. 17, each accommodating cavity 300 is provided with only one electrode core string 401. In this case, the mode in which the electrode core strings 400 in two adjacent accommodating cavities 300 are connected in parallel is as follows: the first electrode core assembly 400 of the electrode core string 401 in one of the two adjacent accommodating cavities 300 is electrically connected to the first electrode core assembly 400 of the electrode core string 401 in the other accommodating cavity 300, and the last electrode core assembly 400 of the electrode core string 401 in one of the two adjacent accommodating cavities 300 is electrically connected to the last electrode core assembly 400 of the electrode core string 401 in the other accommodating cavity 300. In FIG. 17, the first electrode core assembly 400 in the electrode core string 401 is the leftmost electrode core assembly 400, and the last electrode core assembly 400 of the electrode core string 401 is the rightmost electrode core assembly 400. In an embodiment, the first electrode core assembly 400 in the electrode core string 401 is the rightmost electrode core assembly 400, and the last electrode core assembly 400 of the electrode core string 401 is the leftmost electrode core assembly 400.

Referring to FIG. 9 and FIG. 10 again, in further embodiments, each of the electrode core assemblies 400 includes an electrode core assembly body 430, and a first electrode lead-out member 410 and a second electrode lead-out member 420 configured to lead out currents. The first electrode lead-out member 410 and the second electrode lead-out member 420 are disposed on two opposite sides of the electrode core assembly body 430 in the second direction. The first electrode lead-out member 410 of one of two adjacent electrode core assemblies 400 in the electrode core string 401 is electrically connected to and the second electrode lead-out member 420 of the other electrode core assembly 400 through the second conductive member 460.

A fixing spacer 450 is arranged between the electrode core assembly bodies 430 of two adjacent electrode core assemblies 400. The second conductive member 460 is fixed in the fixing spacer 450. Structural adhesives are injected between the electrode core assembly bodies 430 of two adjacent electrode core assemblies 400 and the fixing spacer 450. In this way, multiple electrode core assemblies 400 are connected into a whole through the structural adhesives, so that the structural strength of the electrode core strings 401 can be improved, thereby facilitating mounting the electrode core strings 401 in the accommodating cavity 300.

The fixing spacer 450 includes a first spacer 453 and a second spacer 454 oppositely arranged in a third direction. The second conductive member 460 is arranged between the first spacer 453 and the second spacer 454. The first spacer 453 is connected to the second spacer 454 to clamp and fix the second conductive member 460, in order to prevent the movement between the electrode core assemblies 400.

In this embodiment, an insertion pin 451 is arranged on a surface of one of the first spacer 453 and the second spacer 454 that faces the second conductive member 460. An insertion hole 452 is provided on the other of the first spacer 453 and the second spacer 454. The first spacer 453 and the second spacer 454 are fixedly connected by inserting the insertion pin 451 into the insertion hole 452, and the second conductive member 460 are clamped therebetween.

Referring to FIG. 18, in further embodiments, the multiple electrode core assemblies 400 constituting the electrode core string 401 are packaged in an encapsulation film 500. Each of the electrode core assemblies 400 includes an electrode core assembly body 430, and a first electrode lead-out member 410 and a second electrode lead-out member 420 configured to lead out currents. A joint between the first electrode lead-out member 410 of one of two electrode core assemblies 400 connected in series and the second electrode lead-out member 420 of the other electrode core assembly 400 is in the encapsulation film 500. Packaging components 510 are formed on the encapsulation film 500 at positions corresponding to the first electrode lead-out member 410 and/or the second electrode lead-out member 420 to isolate two adjacent electrode core assembly bodies 430.

The multiple electrode core assemblies 400 are isolated through the packaging components 510 to prevent electrolytes from circulating between the multiple electrode core assemblies 400. The multiple electrode core assemblies 400 do not affect each other, and the electrolytes in the multiple electrode core assemblies 400 are not decomposed due to an excessive potential difference, ensuring the safety and service life of the battery.

The packaging components 510 can be implemented in multiple manners. For example, the encapsulation film 500 can be tightened with a tie to form the packaging components 510, or the encapsulation film 500 can be thermally fused to form the packaging components 510. The specific mode of the packaging components 510 is not specifically limited.

In the present disclosure, a sealing material used for the encapsulation film 500 is a PET and a PP composite film or an aluminum-plastic film. Moreover, the electrode core assemblies 400 expand after capacity grading and formation. In the present disclosure, the cavity inside the encapsulation film 500 is vacuumed to a negative pressure to constrain the electrode core assemblies 400, and therefore, the airtightness requirement for the accommodating cavities 300 in the encapsulation film 500 is required.

Referring to FIG. 19, in some other embodiments, each electrode core assembly 400 is respectively packaged in one encapsulation film 500 to form an electrode core assembly module. The electrode core assembly modules are connected in series.

In other words, there is a one-to-one correspondence between the number of the encapsulation films 500 and the number of electrode core assemblies 400. Each electrode core assembly 400 is individually packaged in one encapsulation film 500. In this embodiment, after the multiple electrode core assemblies 400 are prepared, an encapsulation film 500 can be individually wrapped around each electrode core assembly 400, and then the electrode core assemblies 400 are connected in series.

In further embodiments, the air pressure in each of the accommodating cavities 300 is lower than the air pressure outside the housing 100. The air pressure in the accommodating cavity 300 may be lower than the air pressure outside the housing 100 by vacuuming an interior of the accommodating cavity 300. After the accommodating cavity 300 is vacuumed, the amount of water vapor, oxygen and other substances in the housing 100 can be reduced, so as to prevent the long-term aging effects of the water vapor and oxygen on the electrode core assemblies 400 and components in the housing 100, thereby prolonging the service life of the electrode core assemblies 400 or the components in the housing 100.

In further embodiments, the housing 100 is provided with a suction hole. There may be one or more suction holes, which can be arranged on the top plate 102 or the bottom plate 103 at positions corresponding to the accommodating cavities 300, or arranged on the first edge beam 106 and the second edge beam 107.

In further embodiments, the housing 100 is provided with adhesive injection holes 112 (as shown in FIG. 2). Each accommodating cavity 300 is correspondingly communicated with at least one adhesive injection hole 112. The adhesive injection holes 112 are configured to inject adhesives into the corresponding accommodating cavities 300, to fixedly connect the electrode core assemblies 400 and the housing 100. The electrode core assemblies 400, the housing 100, and the reinforcing plates 200 can be fixedly connected together through potting of hollow glass microsphere filler adhesives or structural adhesives, thereby further improving the structural strength of the battery pack 10. In this embodiment, the adhesive injection holes 112 are arranged on the top plates 102 of the sub-housings 101. In other embodiments, the adhesive injection holes 112 can also be arranged on the bottom plates 103 of the sub-housings 101.

In further embodiments, two adjacent electrode core assemblies 400 in the electrode core strings 401 are electrically connected through second conductive members 460, and the adhesive injection holes 112 are arranged corresponding to the second conductive members 460. This arrangement can ensure that the electrode core assemblies 400 have a high connection strength.

In some embodiments, as shown in FIG. 2, the housing 100 is provided with explosion-proof valves 800, and the explosion-proof valves 800 seal the adhesive injection holes 112. In this way, the explosion-proof valves 800 can not only serve as sealing covers for sealing the adhesive injection holes 112, but also achieve safe and explosion-proof functions.

Figure 20:
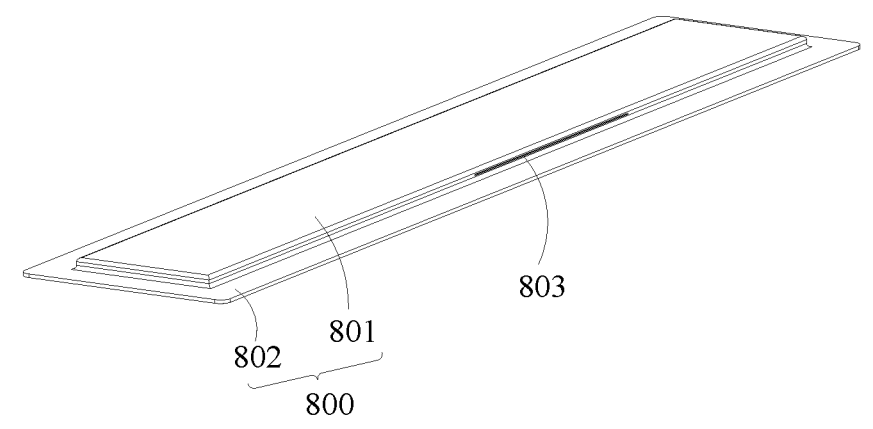
FIG. 20 is a schematic diagram of a structure of an explosion-proof valve according to an embodiment of the present disclosure.
Figure 21:
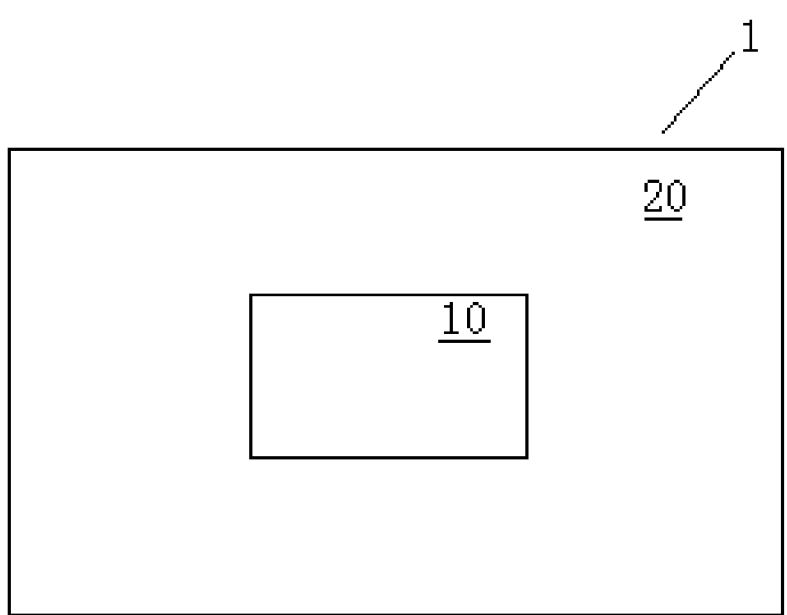
FIG. 21 is a schematic diagram of a structure of an electric vehicle according to an embodiment of the present disclosure.

In some embodiments, as shown in FIG. 2 and FIG. 20, each of the explosion-proof valves 800 has a weak area 803. The explosion-proof valve 800 includes a cover body 802 connected to and sealed with the housing 100 and a protruding component 801 arranged on the cover body 802. The protruding component 801 protrudes toward a side facing away from the electrode core assemblies 400. The weak area 803 is formed on an outer peripheral wall of the protruding component 801. In this way, when the electrode core assemblies 400 in the battery pack 10 work abnormally and produce excessive gas, the weak areas 803 of the explosion-proof valves 800 are broken due to the air pressure, so that an accident of the battery pack 10 can be prevented.

It should be noted that the weak areas 803 may be grooves or scores. In an embodiment, a thickness of the weak area 803 is lower than thicknesses of other portions on the explosion-proof valve 800.

Further, the adhesive injection holes 112 are provided on the top plates 102, and the cover bodies 802 are connected to and sealed with the top plates 102. The sealing connection mode is not specifically limited, for example, the sealing connection can be achieved by welding or gluing.

In an embodiment, the battery pack 10 further includes multiple liquid cooling members 900. The multiple liquid cooling members 900 are correspondingly arranged on the bottom plates 103 of the multiple sub-housings 101. The cooling and heat dissipation of the electrode core assemblies 400 can be implemented by arranging the liquid cooling members 900. Further, the multiple liquid cooling members 900 are integrally formed. This arrangement can simplify the processing technology and reduce the cost.

The present disclosure further provides an electric vehicle 1, which includes a vehicle body 20 and the described battery pack 10. The battery pack 10 is fixed to the vehicle body 20 through the mounting component 104. According to the electric vehicle 1 provided by the present disclosure, when the battery pack 10 is mounted on the vehicle, the structural strength of the battery pack 10 can be taken as a part of the structural strength of the vehicle. Therefore, the structural strength of the vehicle can be enhanced, which achieves the requirements of a lightweight electric vehicle, and also reduces the design and manufacturing costs of the vehicle. In addition, the height of the battery pack 10 of the present disclosure is relatively low, so as not to take up much height space of the vehicle.

The foregoing embodiments only describe several implementations of the present disclosure specifically and in detail, but cannot be construed as a limitation to the patent scope of the present disclosure. It should be noted that, for a person of ordinary skill in the art, several transformations and improvements can be made without departing from the concept of the present disclosure. These transformations and improvements all fall within the protection scope of the present disclosure. Therefore, the protection scope of the patent of the present disclosure shall be subject to the appended claims.

What is claimed is:

1. A battery pack, comprising a housing and multiple electrode core strings electrically connected to each other and disposed in the housing, wherein the housing comprises a housing body, the housing body comprises multiple sub-housings connected to each other, and at least one of the sub-housings comprises at least one reinforcing plate;

each of the sub-housings comprises a top plate and a bottom plate oppositely arranged in a first direction, the first direction is a height direction of the housing, the at least one reinforcing plate is arranged between the top plate and the bottom plate, the at least one reinforcing plate is connected to the top plate and the bottom plate and divides an interior of a corresponding sub-housing into multiple accommodating cavities, and at least one of the accommodating cavities comprises at least one of the electrode core strings;

each of the electrode core strings comprises multiple electrode core assemblies connected and arranged in a second direction, the electrode core assemblies are disposed in an encapsulation film, a length of the electrode core string extends in the second direction, and the second direction is a length direction of the housing or a width direction of the housing; and the housing comprises a first edge beam and a second edge beam protruding from and disposed on two opposite sides of the housing body along a third direction, and a mounting component disposed outside the housing body and configured to be connected and fixed to an external structure, wherein each of the first edge beam and the second edge beam comprises a cavity, and the cavity is divided into multiple sub-cavities by at least one partition plate.

2. The battery pack according to claim 1, wherein the second direction is the length direction of the housing, and the third direction is the width direction of the housing; or the second direction is the width direction of the housing, and the third direction is the length direction of the housing.

3. The battery pack according to claim 2, wherein the sub-housings are arranged in the third direction;

the sub-housings comprise two end sub-housings on the two opposite sides of the housing body in the third direction; and a first end sub-housing of the two end sub-housings is connected to the first edge beam, and a second end sub-housing of the two end sub-housings is connected to the second edge beam.

4. The battery pack according to claim 3, wherein the first end sub-housing and the first edge beam are integrally formed; or the second end sub-housing and the second edge beam are integrally formed; or the first end sub-housing and the first edge beam are integrally formed, and the second end sub-housing and the second edge beam are integrally formed.

5. The battery pack according to claim 1, wherein each of the sub-housings comprises multiple reinforcing plates;

the reinforcing plates are spaced apart in the third direction;

a length of each of the reinforcing plates extends in the second direction;

each of the reinforcing plates is connected to the top plate and the bottom plate; and at least one of the top plate and the bottom plate is integrally formed with the reinforcing plates.

6. The battery pack according to claim 1, wherein each of the sub-housings has a first end and a second end opposite in the second direction; at least one of the first end and the second end of the sub-housing comprises an opening; and the housing further comprises end plates covering openings of the sub-housings, and each of the openings corresponds to at least one of the end plates.

7. The battery pack according to claim 6, wherein the battery pack further comprises multiple insulating supports on inner sides of the end plates, and the insulating supports are arranged at the openings; and two electrode core assemblies arranged at openings on a same end of the sub-housings and respectively in two adjacent accommodating cavities are electrically connected through a first conductive member, and the first conductive member is fixed on the insulating supports.

8. The battery pack according to claim 7, wherein the battery pack further comprises multiple insulating protective covers, and the insulating protective covers are disposed between the insulating supports and the end plates.

9. The battery pack according to claim 1, wherein the lengths of the electrode core strings are greater than 400 mm;

each of the electrode core assemblies comprises a first electrode lead-out member and a second electrode lead-out member configured to lead out currents;

the first electrode lead-out member and the second electrode lead-out member are disposed on two opposite sides of each of the electrode core assemblies in the second direction; and a first electrode lead-out member of a first one of two adjacent electrode core assemblies in the electrode core string is electrically connected to a second electrode lead-out member of a second one of the two adjacent electrode core assemblies.

10. The battery pack according to claim 9, wherein each of the accommodating cavities comprises a plurality of electrode core strings;

the plurality of electrode core strings are connected and arranged in a thickness direction of the electrode core assemblies;

the thickness direction of the electrode core assemblies is parallel to the third direction; and the second direction is the length direction of the housing, and the third direction is the width direction of the housing; or the second direction is the width direction of the housing, and the third direction is the length direction of the housing.

11. The battery pack according to claim 10, wherein a first electrode core assembly of a first one of two adjacent electrode core strings is electrically connected to a first electrode core assembly of a second one of the two adjacent electrode core strings, and the multiple electrode core strings in a same accommodating cavity are connected in series; or a last electrode core assembly of the first one of the two adjacent electrode core strings is electrically connected to a last electrode core assembly of the second one of the two adjacent electrode core strings, and the multiple electrode core strings in a same accommodating cavity are connected in series; or the first electrode core assembly of the first one of the two adjacent electrode core strings is electrically connected to the first electrode core assembly of the second one of the two adjacent electrode core strings, and the last electrode core assembly of the first one of the two adjacent electrode core strings is electrically connected to the last electrode core assembly of the second one of the two adjacent electrode core strings, and the multiple electrode core strings in a same accommodating cavity are connected in parallel.

12. The battery pack according to claim 10, wherein a first electrode core assembly of one of first electrode core strings in a first one of two adjacent accommodating cavities is electrically connected to a first electrode core assembly of one of second electrode core strings in a second one of the two adjacent accommodating cavities, and the first electrode core strings and the second electrode core strings are connected in series; or a last electrode core assembly of one of the first electrode core strings in the first one of the two adjacent accommodating cavities is electrically connected to a last electrode core assembly of one of the second electrode core strings in the second one of the two adjacent accommodating cavities, and the first electrode core strings and the second electrode core strings are connected in series; or the first electrode core assembly of one of the first electrode core strings in the first one of the two adjacent accommodating cavities is electrically connected to the first electrode core assembly of one of the second electrode core strings in the second one of the two adjacent accommodating cavities, and the last electrode core assembly of one of the first electrode core strings in the first one of the two adjacent accommodating cavities is electrically connected to the last electrode core assembly of one of the second electrode core strings in the second one of the two adjacent accommodating cavities, and the first electrode core strings and the second electrode core strings are connected in parallel.

13. The battery pack according to claim 1, wherein each of the electrode core assemblies comprises an electrode core assembly body, and a first electrode lead-out member and a second electrode lead-out member configured to lead out currents, the first electrode lead-out member and the second electrode lead-out member are disposed on two opposite sides of each electrode core assembly body in the second direction, and a first electrode lead-out member of a first one of two adjacent electrode core assemblies in the electrode core string is electrically connected to a second electrode lead-out member of a second one of the two adjacent electrode core assemblies through a second conductive member;

a fixing spacer is arranged between electrode core assembly bodies of the two adjacent electrode core assemblies, the second conductive member is fixed in the fixing spacer, and structural adhesives are injected between the electrode core assembly bodies of the two adjacent electrode core assemblies and the fixing spacer; and the fixing spacer comprises a first spacer and a second spacer oppositely arranged in the third direction, the second conductive member is arranged between the first spacer and the second spacer, the first spacer is connected to the second spacer to clamp and fix the second conductive member.

14. The battery pack according to claim 1, wherein each of the electrode core assemblies comprises an electrode core assembly body, and a first electrode lead-out member and a second electrode lead-out member configured to lead out currents;

a joint between a first electrode lead-out member of a first one of two electrode core assemblies connected in series and a second electrode lead-out member of a second one of the two electrode core assemblies connected in series is disposed in the encapsulation film; and packaging components are formed on the encapsulation film at positions corresponding to the first electrode lead-out member and/or the second electrode lead-out member to isolate two adjacent electrode core assembly bodies.

15. The battery pack according to claim 1, wherein each of the electrode core assemblies is disposed in an encapsulation film to form an electrode core assembly module, and electrode core assembly modules are connected in series.

16. The battery pack according to claim 1, wherein the housing comprises explosion-proof valves, and the explosion-proof valves seal an adhesive injection holes.

17. The battery pack according to claim 16, wherein each of the explosion-proof valves has a weak area;

the explosion-proof valve comprises a cover body connected to the housing and a protruding component arranged on the cover body;

the protruding component protrudes toward a side of the housing facing away from the electrode core assemblies; and the weak area is formed on an outer peripheral wall of the protruding component.

18. The battery pack according to claim 1, wherein the battery pack further comprises multiple liquid cooling members correspondingly arranged on the bottom plates of the sub-housings, and the multiple liquid cooling members are integrally formed.

19. The battery pack according to claim 1, wherein each of the sub-housings comprises multiple reinforcing plates, the reinforcing plates are spaced apart in the third direction, a length of each of the reinforcing plates extends in the second direction, each of the reinforcing plates is connected to the top plate and the bottom plate, and at least one of the top plate and the bottom plate is integrally formed with the reinforcing plates;

each of the sub-housings has a first end and a second end opposite in the second direction, each of the first end and the second end of the sub-housing comprises an opening, the housing further comprises end plates covering openings of the sub-housings, and each of the openings corresponds to at least one of the end plates; and the second direction is the length direction of the housing, and the third direction is the width direction of the housing; or the second direction is the width direction of the housing, and the third direction is the length direction of the housing.

20. An electric vehicle, comprising a vehicle body and a battery pack, wherein the battery pack comprises a housing and multiple electrode core strings electrically connected to each other and disposed in the housing;

the housing comprises a housing body, the housing body comprises multiple sub-housings connected to each other, and at least one of the sub-housings comprises at least one reinforcing plate;

each of the sub-housings comprises a top plate and a bottom plate oppositely arranged in a first direction, the first direction is a height direction of the housing, the at least one reinforcing plate is arranged between the top plate and the bottom plate, the at least one reinforcing plate is connected to the top plate and the bottom plate and divides an interior of a corresponding sub-housing into multiple accommodating cavities, and at least one of the accommodating cavities comprises at least one of the electrode core strings;

each of the electrode core strings comprises multiple electrode core assemblies connected and arranged in a second direction, the electrode core assemblies are disposed in an encapsulation film, a length of the electrode core string extends in the second direction, and the second direction is a length direction of the housing or a width direction of the housing;

the housing comprises a first edge beam and a second edge beam disposed on two opposite sides of the housing body along a third direction, and a mounting component disposed outside the housing body and configured to be connected and fixed to an external structure, wherein each of the first edge beam and the second edge beam comprises a cavity, and the cavity is divided into multiple sub-cavities by at least one partition plate; and the battery pack is fixed to the vehicle body through the mounting component.

* * * * *